United States Patent
Villa

(10) Patent No.: US 11,726,472 B2
(45) Date of Patent: Aug. 15, 2023

(54) HIGH-EFFICIENCY DRONE MANAGEMENT

(71) Applicant: Joby Aero, Inc., Santa Cruz, CA (US)

(72) Inventor: Ian Andreas Villa, San Francisco, CA (US)

(73) Assignee: Joby Aero, Inc, Santa Cruz, CA (US)

( * ) Notice: Subject to any disclaimer, the term of this patent is extended or adjusted under 35 U.S.C. 154(b) by 398 days.

(21) Appl. No.: 16/948,422

(22) Filed: Sep. 17, 2020

(65) Prior Publication Data
US 2021/0080946 A1    Mar. 18, 2021

Related U.S. Application Data

(60) Provisional application No. 62/901,380, filed on Sep. 17, 2019.

(51) Int. Cl.
*G05D 1/00* (2006.01)
*B64C 39/02* (2023.01)
*B64U 101/60* (2023.01)

(52) U.S. Cl.
CPC ......... *G05D 1/0027* (2013.01); *B64C 39/024* (2013.01); *G05D 1/0022* (2013.01); *B64U 2101/60* (2023.01)

(58) Field of Classification Search
CPC .............. G05D 1/0027; G05D 1/0022; G05D 2201/0213; G05D 1/0297; G05D 1/104; B64C 39/024; B64C 2201/128; G06Q 50/30; G06Q 10/06312
USPC .......................................................... 701/3
See application file for complete search history.

(56) References Cited

U.S. PATENT DOCUMENTS

| | | | |
|---|---|---|---|
| 9,792,576 B1 * | 10/2017 | Jamjoom | G05D 1/104 |
| 9,997,080 B1 * | 6/2018 | Chambers | G08G 5/0069 |
| 10,313,638 B1 * | 6/2019 | Yeturu | G06T 11/60 |
| 10,322,801 B1 * | 6/2019 | Yeturu | B64C 39/024 |
| 11,279,481 B2 * | 3/2022 | Burks | H04W 12/03 |
| 11,410,562 B1 * | 8/2022 | Mishra | G08G 5/0013 |
| 2015/0124099 A1 * | 5/2015 | Evanitsky | G08G 1/205 348/149 |
| 2017/0286887 A1 * | 10/2017 | Moran | B64C 39/024 |

FOREIGN PATENT DOCUMENTS

WO    WO-2017/138922    *    8/2017

OTHER PUBLICATIONS

Uber, "Fast-Forwarding to a Future of On-Demand Urban Air Transportation Introduction", Uber Elevate, (Oct. 27, 2016), 98 pgs.

* cited by examiner

*Primary Examiner* — Muhammad Shafi
(74) *Attorney, Agent, or Firm* — Dority & Manning, P.A.

(57) ABSTRACT

Disclosed are embodiments for determining efficient utilization of drones. In some aspects, a drone may be performing a task, and a new task may be identified. Whether the drone should be diverted from the existing task to the new task, in some embodiments, is based on a number of factors. These factors include, for example, a value associated with the existing task and a value associated with the new task. The values are based on, for example, a potential delay introduced in completing the existing task if the drone is diverted to the new task.

20 Claims, 23 Drawing Sheets

HIGH-EFFICIENCY DRONE MANAGEMENT

CROSS REFERENCE TO RELATED APPLICATIONS

This application claims priority to U.S. Provisional Application No. 62/901,380, filed Sep. 17, 2019, and entitled "High-Efficiency Drone Management." The content of this prior application is considered part of this application, and is hereby incorporated by reference in its entirety.

FIELD

This document pertains generally, but not by way of limitation, to devices, systems, and methods for operating and/or managing a pool of drones.

BACKGROUND

Drone technology, including both remotely controlled drones and autonomous vehicles, is rapidly evolving. This technology will provide for new transportation service business models. For example, the use of drones will result in significant cost reductions to vehicle operations. In traditional transportation, human drivers or pilots represent a significant portion of total operating costs. Moreover, human drivers or pilots are subject to errors in judgment that can result in accidents and represent a threat to the safe operation of the vehicle. The use of unmanned vehicles promises to substantially reduce these issues.

To provide for unmanned operation, these vehicles include computer-based control systems that communicate with ground-based control computers to receive instructions and provide status information. This integration between ground-based computer control systems and autonomous vehicles can provide additional benefits beyond simply unmanned operation. For example, integrated control systems that control multiple drone vehicles may take advantage of additional efficiencies when synergies between the operation of the multiple vehicles are identified. Thus, improved methods of integrating unmanned vehicle operations are needed.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

Figure 9A:
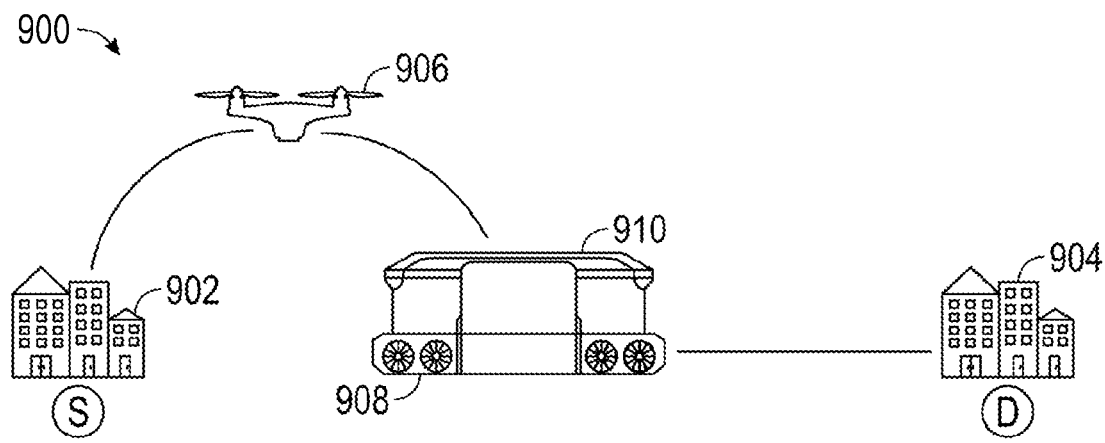
Figure 9B:
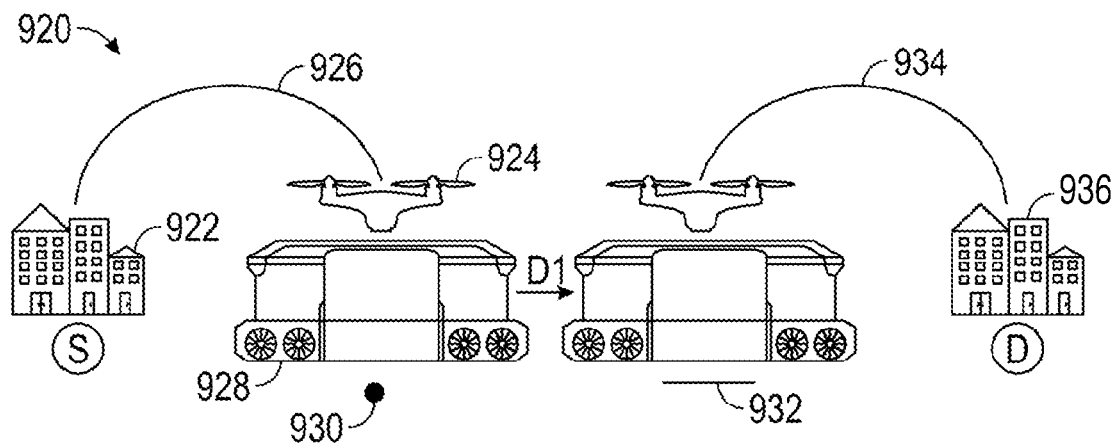

FIGS. 9A-B show two scenarios for multi-modal transport of a payload from an origin location to a destination location.

Figure 10:
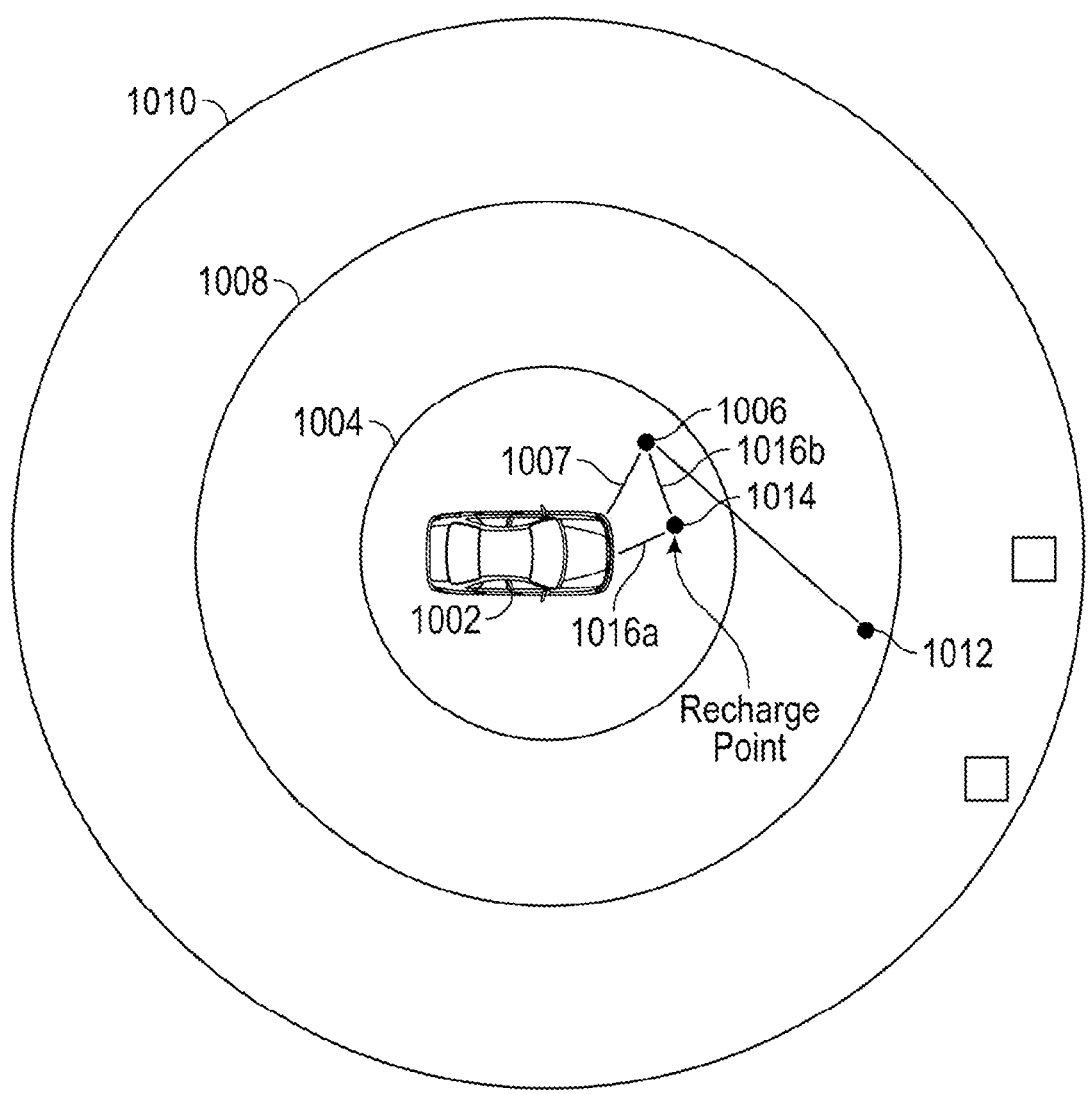

FIG. 10 shows an example of value that is provided by adding charge to a vehicle.

Figure 11:
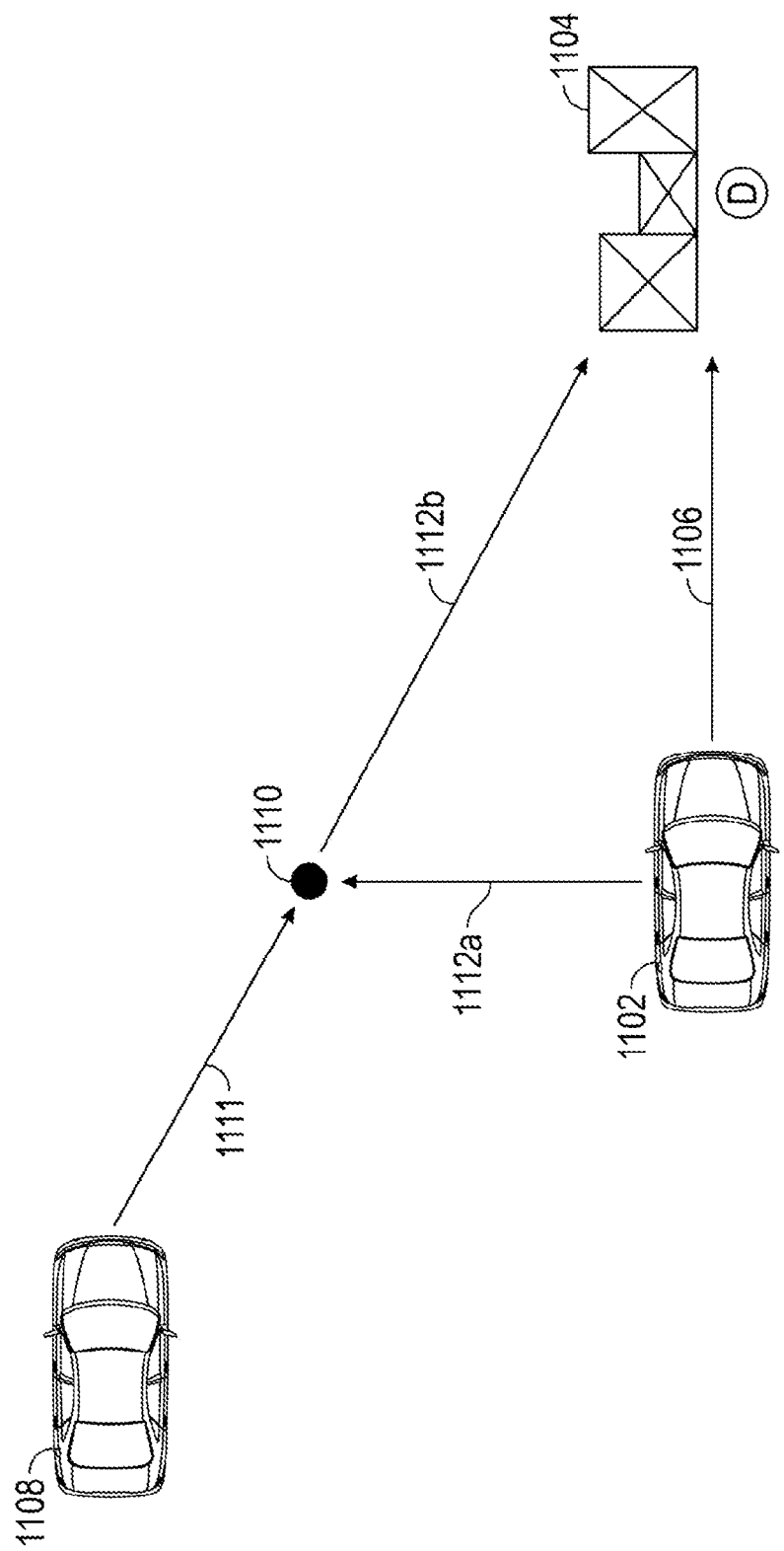

FIG. 11 is a diagram showing a recharge event including a first aerial drone being rerouted to provide charge to a second aerial drone.

Figure 12:
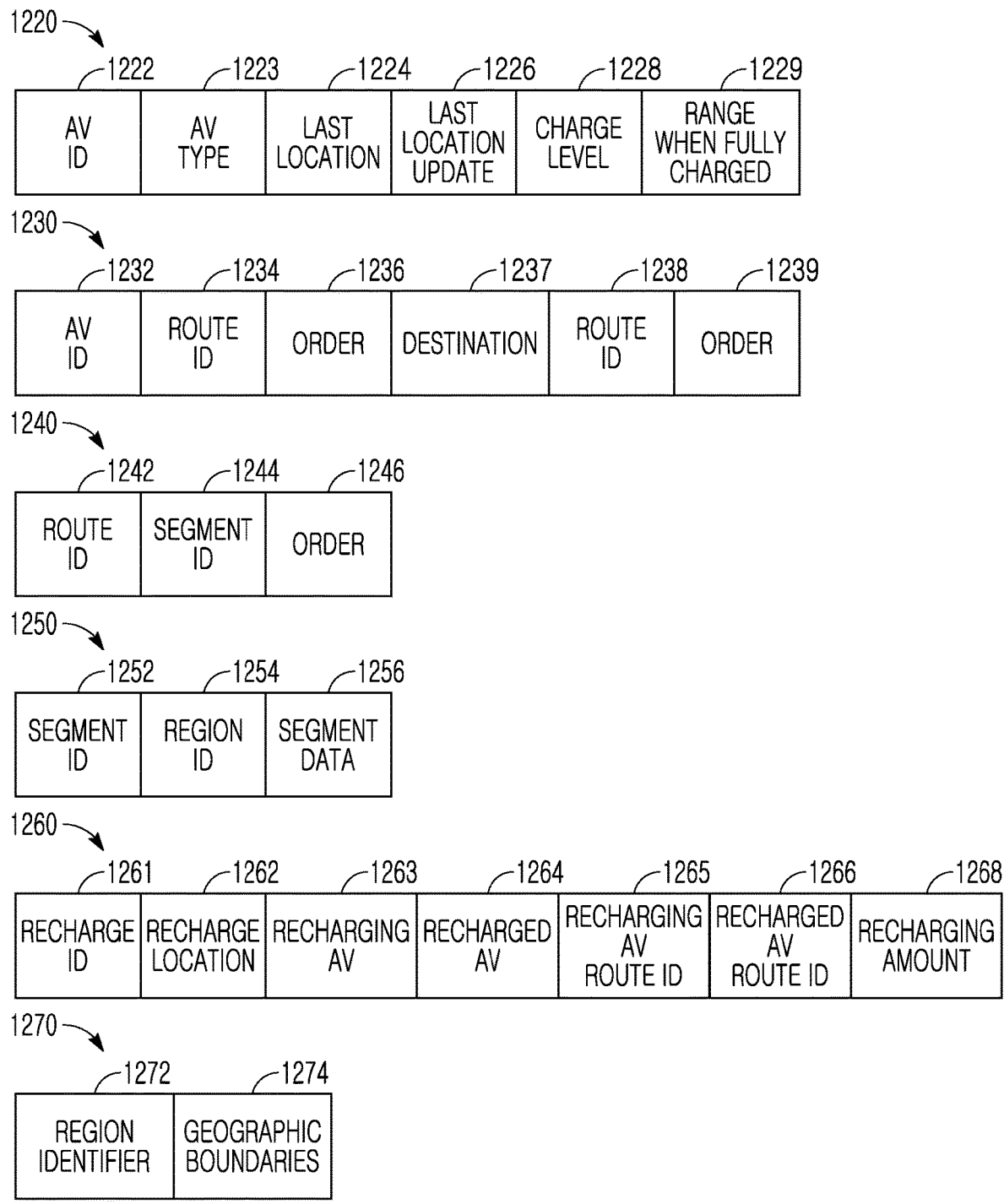

FIG. 12 shows example data structures, one or more of which may be implemented in one or more of the disclosed embodiments.

Figure 13:
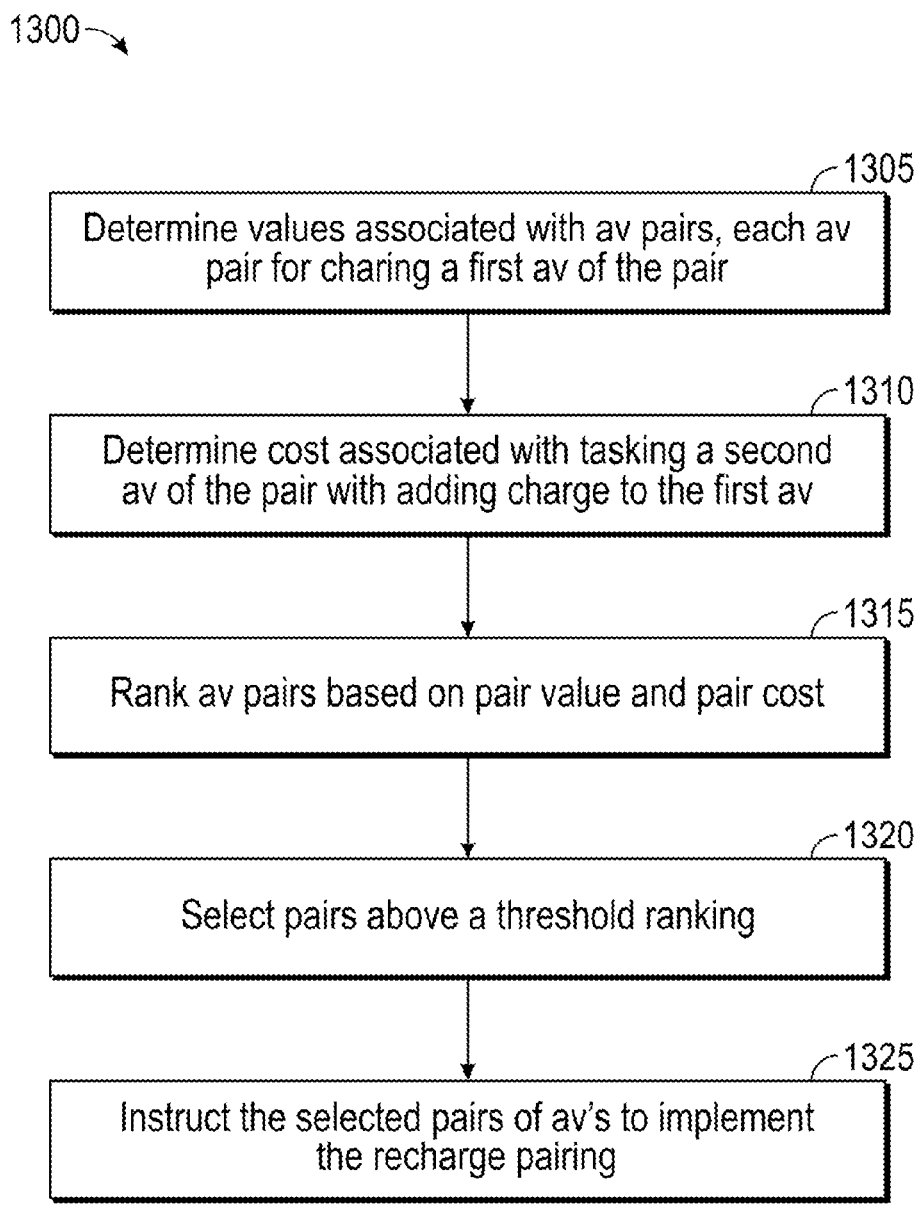

FIG. 13 is a flowchart of a process for recharging a vehicle.

Figure 14:
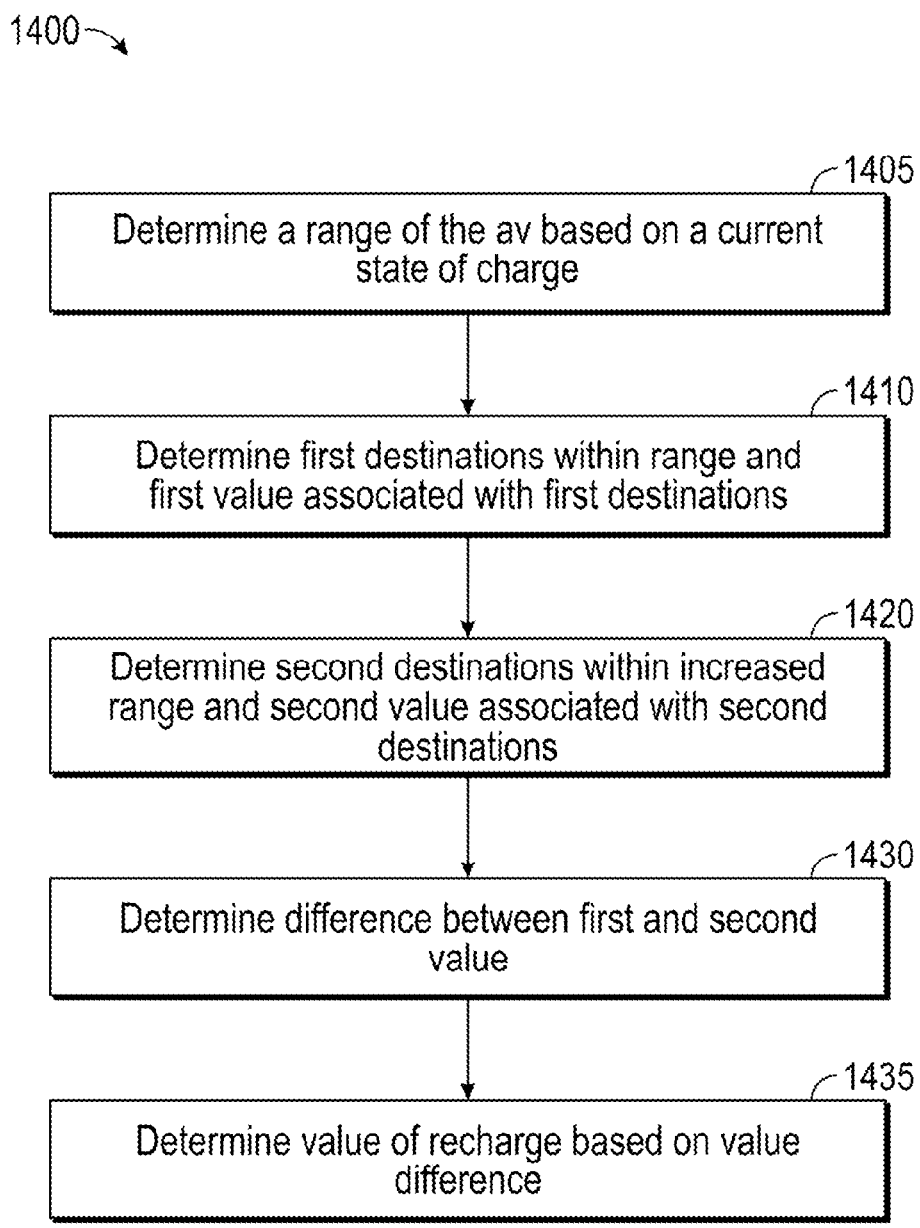

FIG. 14 is a flowchart of a process for determining a value of adding charge to a vehicle.

Figure 15:
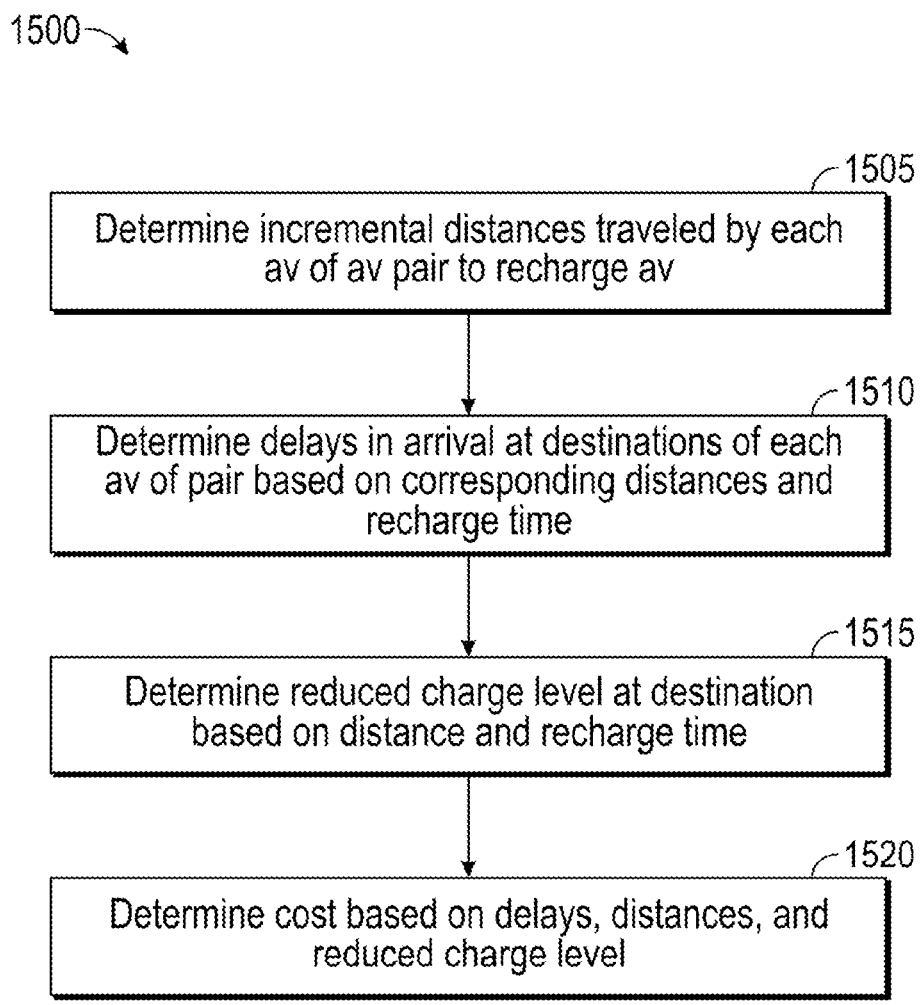

FIG. 15 is a flowchart for a process of determining a cost of providing a charge by a first drone to a vehicle.

Figure 16:
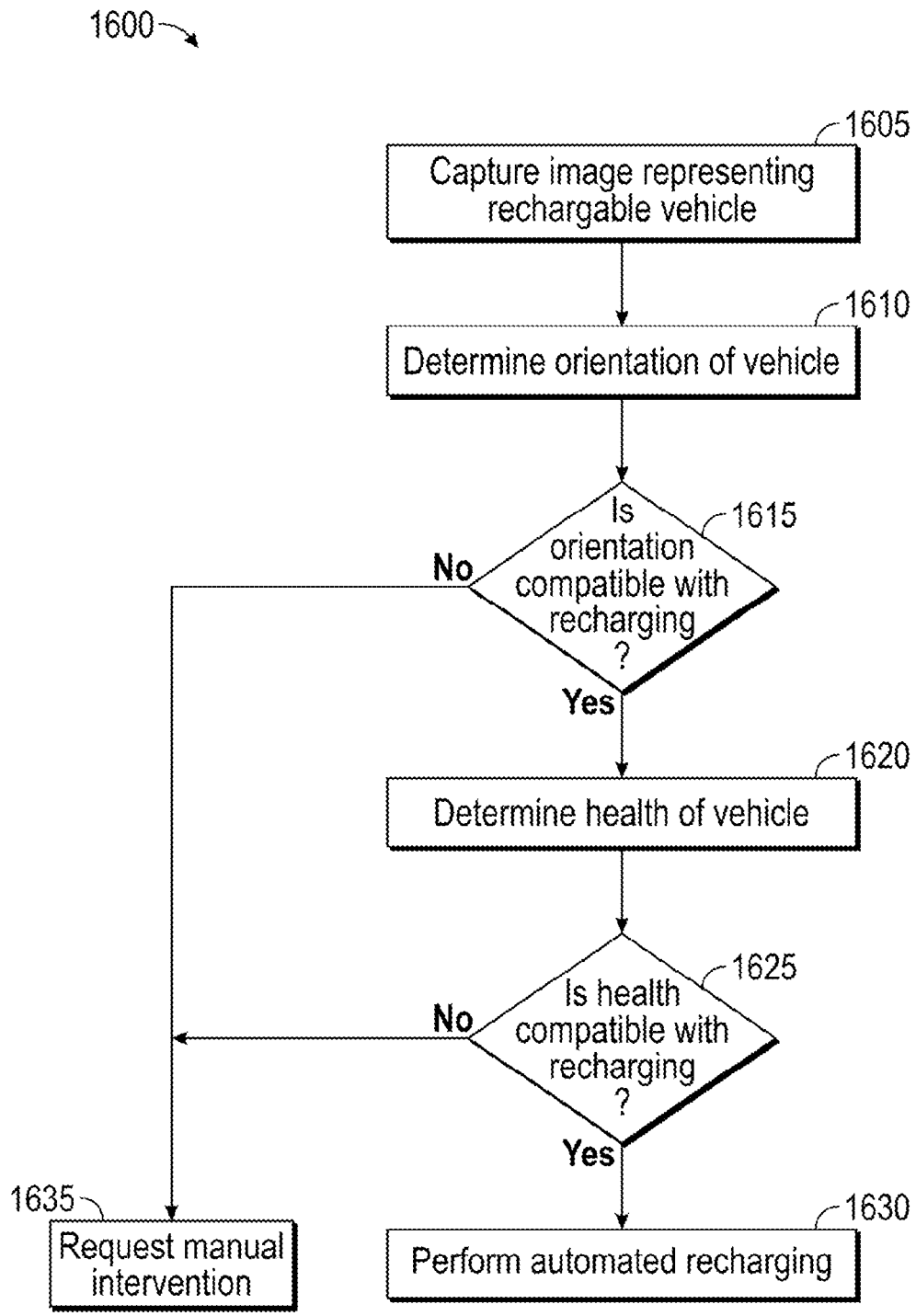

FIG. 16 is a flowchart for a process of performing a health assessment of a vehicle.

Figure 17:
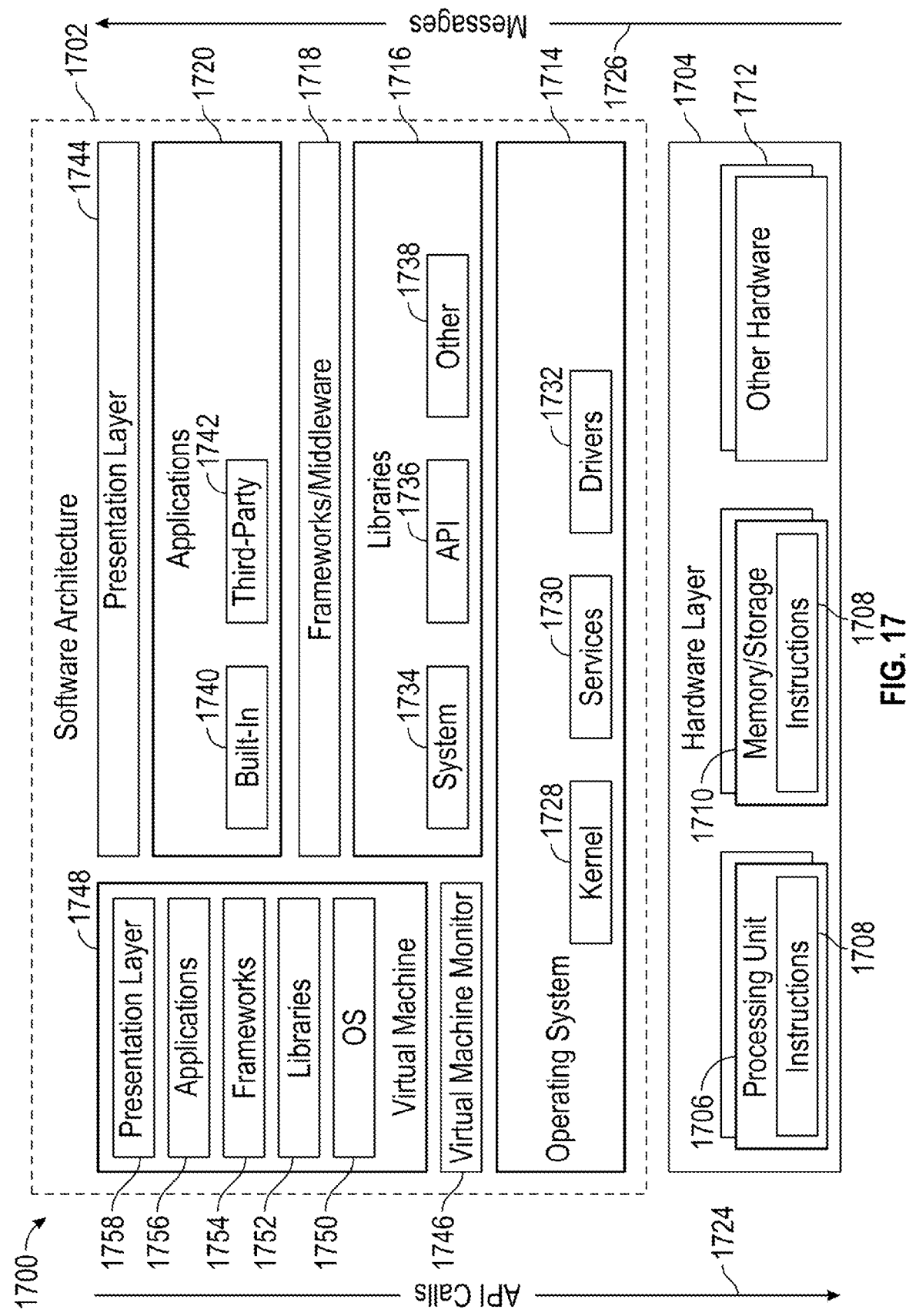

FIG. 17 is a block diagram showing one example of a software architecture for a computing device.

Figure 18:
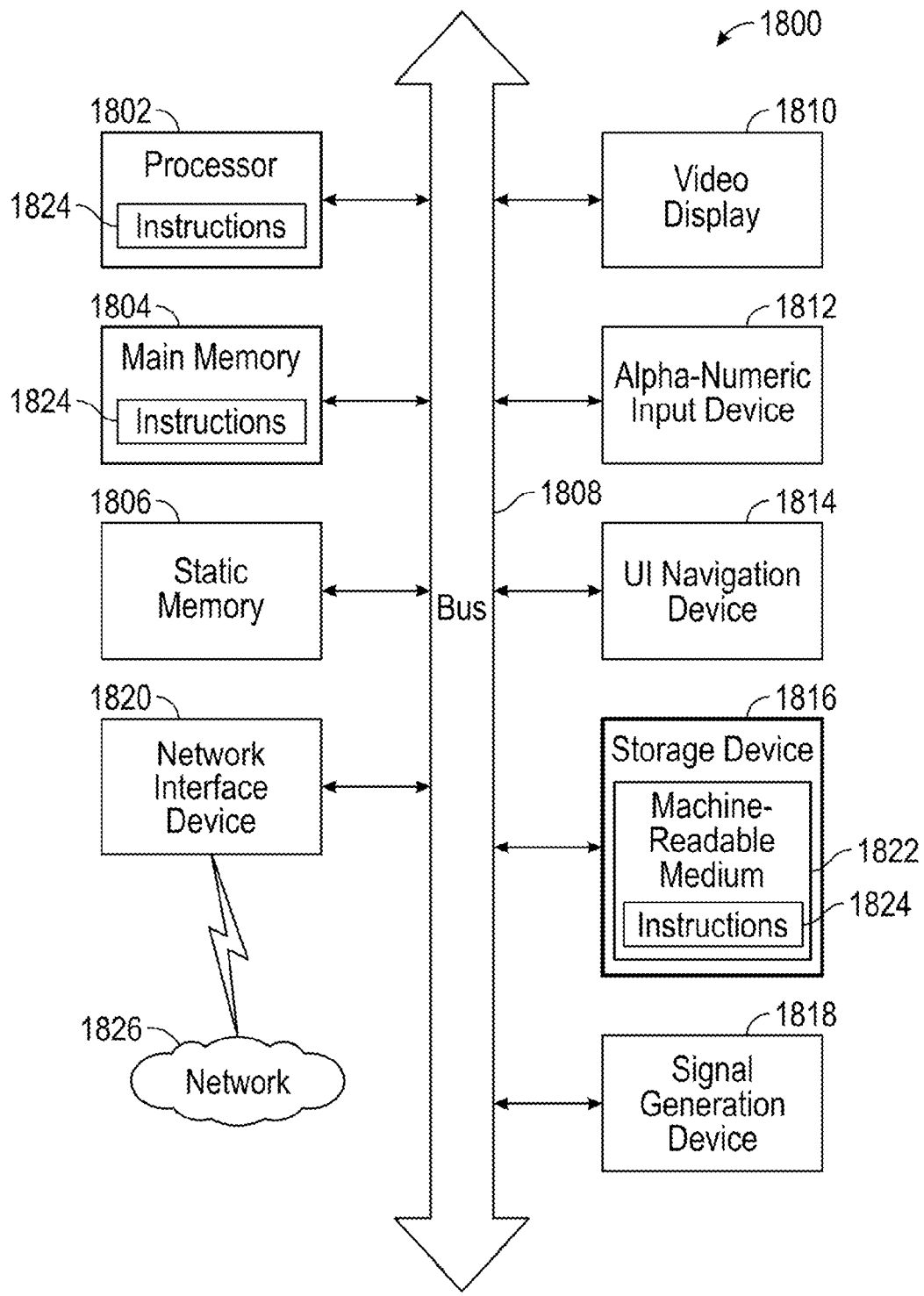

FIG. 18 is a block diagram illustrating a computing device hardware architecture.

Figure 19:
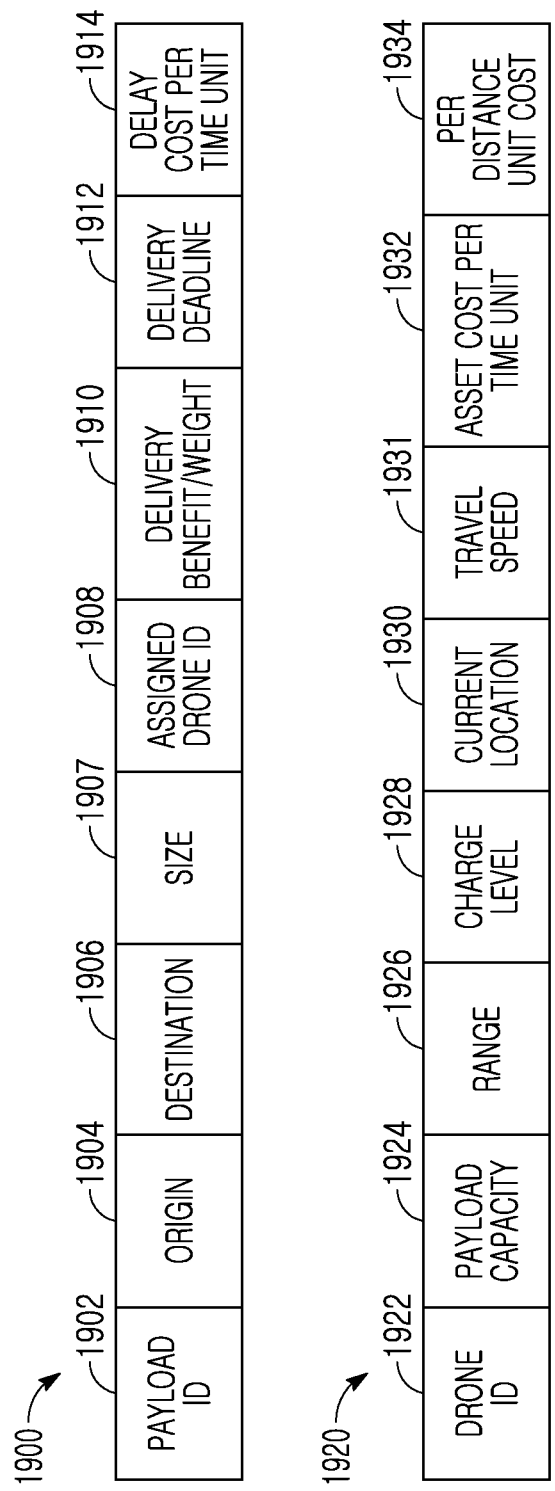

FIG. 19 shows example data structures, one or more of which may be implemented in one or more of the disclosed embodiments.

Figure 20:
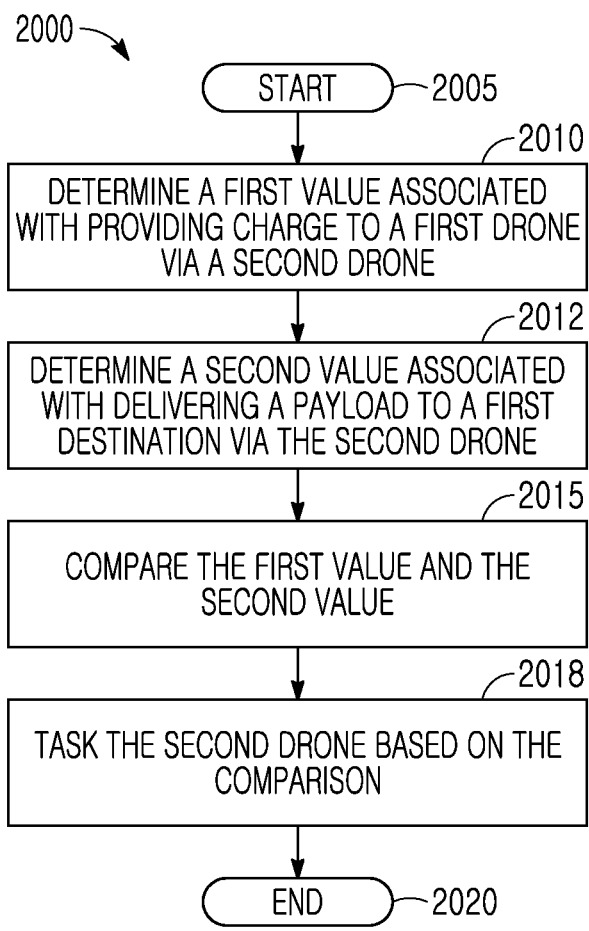

FIG. 20 is a flowchart for a process of tasking a drone based on a comparison of values of different taskings.

Figure 21:
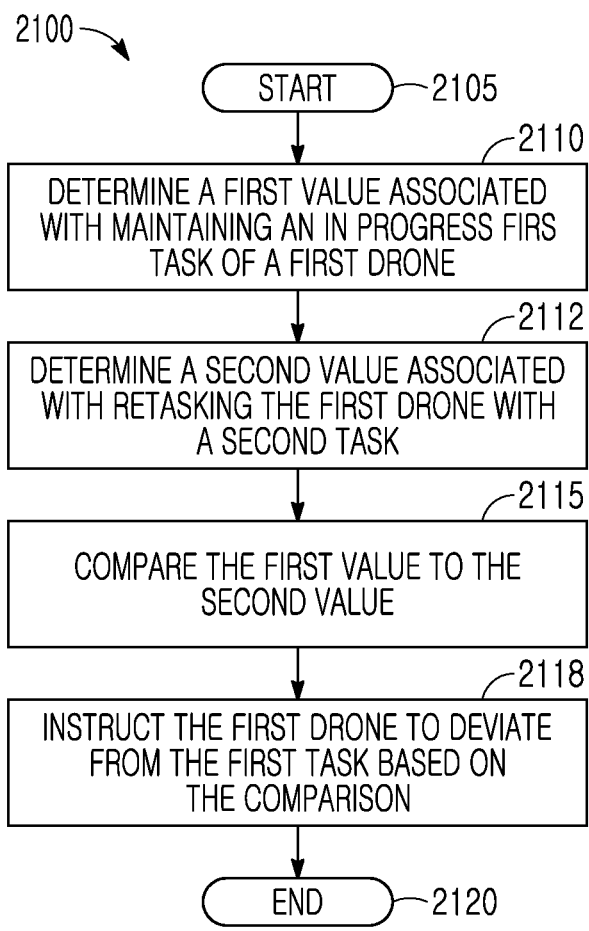

FIG. 21 is a flowchart of a process for deviating a drone from an existing assignment to a different assignment based on a relative value of the two assignments.

Figure 22:
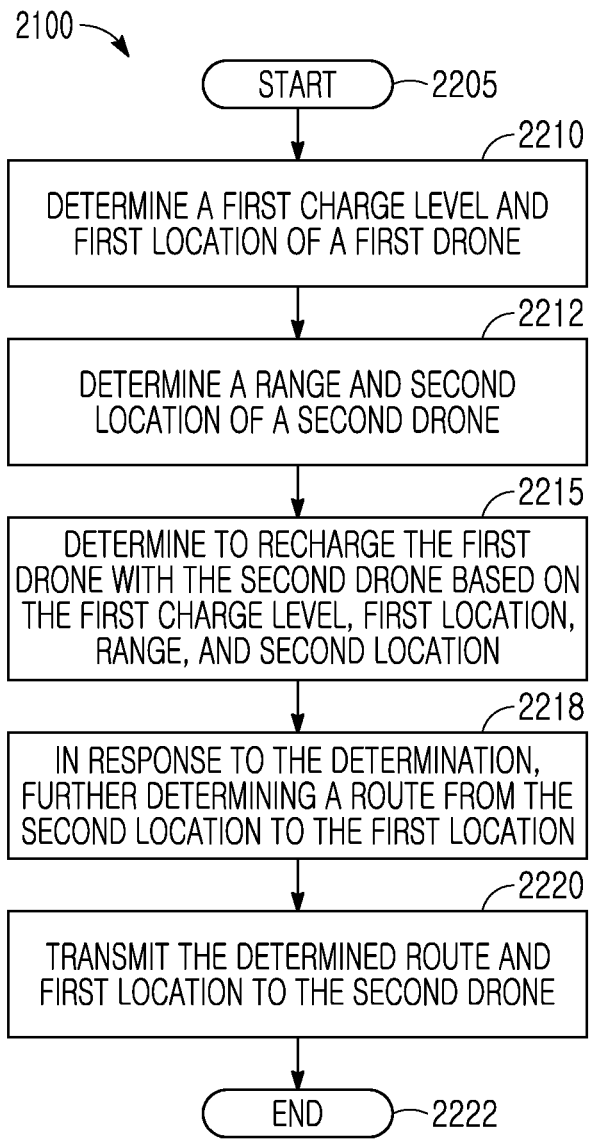

FIG. 22 is a flowchart for a process of determining to reroute a drone from a first route to a second route.

Figure 23:
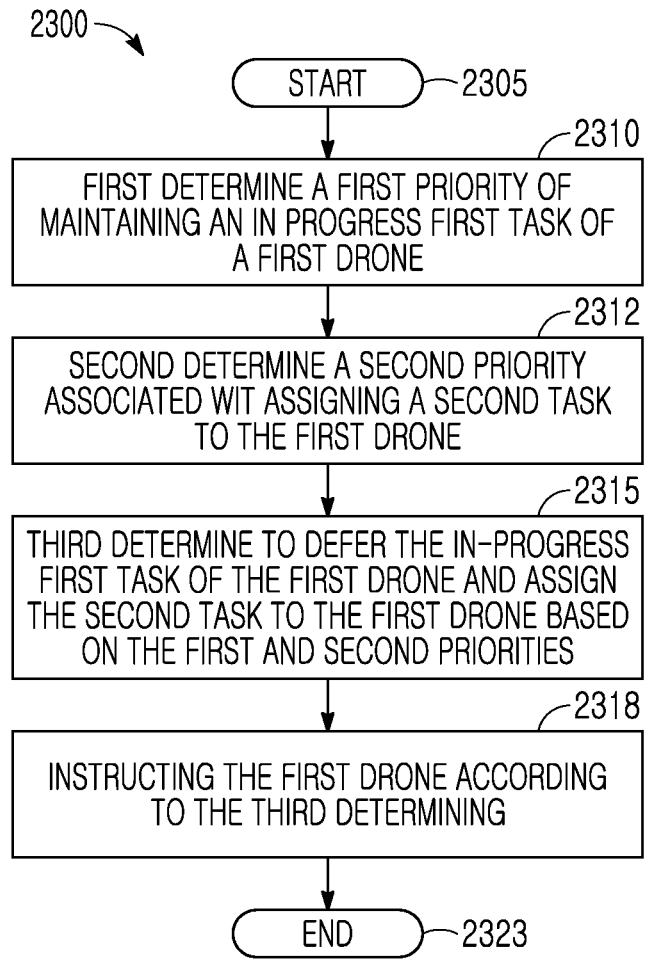

FIG. 23 is a flowchart of a process for deviating a drone from an existing assignment to a different assignment based on a relative value of the two assignments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The disclosed embodiments provide transportation services for customer payloads via a pool of drones. In some cases, some or all of the drones are autonomous vehicles (AVs). To provide for efficient operation, tasks to deliver customer payloads are dynamically assigned to each drone based on priorities associated with each task. Given that the transportation environment can change as new tasks arrive and other tasks are completed, the disclosed embodiments reevaluate task assignments of drones to determine whether modifications are necessary. In some cases, a drone will be assigned a new task upon completion of a first task. In some other cases, a drone may be assigned the new task before the first task has been completed. In this case, the first task is deferred for some period of time until the new task can be completed.

To determine whether any task modifications are appropriate, the disclosed embodiments determine a priority associated with completion of each task within a list of pending tasks. The priorities may be determined based on a number of factors, including one or more of a nature of the payload being delivered (weight, customer, perishability, time constraint associated with payload, or other factors), a proximity of a delivery location associated with the task to other task locations, charge capacities of drones performing the tasks, distances between various task destinations, or other factors. The priorities of two tasks may be evaluated to determine whether the priorities meet one or more criterion. If the criterion is met, a reassignment or re-tasking of a drone may be made. For example, a lower priority task may be deferred, in some cases, so as to complete a higher priority task using the same drone.

Figure 1:
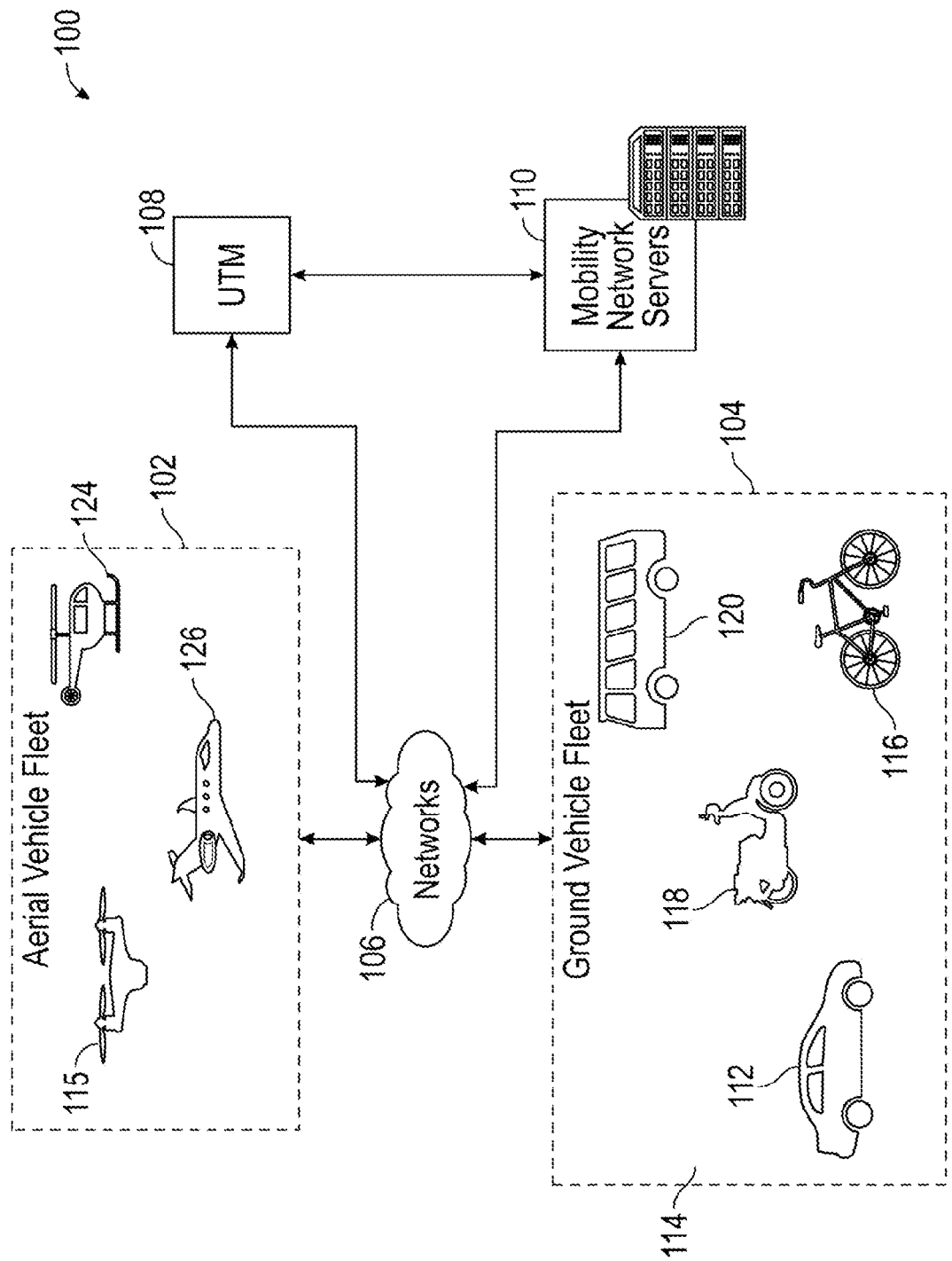
FIG. 1 is a schematic representation of an example transportation environment.

FIG. 1 is a schematic representation of a transportation environment 100, according in an example, in which an aerial vehicle fleet 102 and a ground vehicle fleet 104 provide mobility services (e.g., people transport, goods delivery).

Interactions, communications, and coordination of movement between vehicles of the aerial vehicle fleet 102(e.g., vertical take-off and landing (VTOL) vehicles 115, helicopters 124 and aircraft 126) and the ground vehicle fleet 104 (e.g., automobiles 112, scooters 114, bicycles 116, motorbikes 118, and busses 120) are facilitated through one or more mobility network server(s) 110 that are coupled via the network 106 to both the aerial vehicle fleet 102 and ground vehicle fleet 104. Specifically, the mobility network server(s) 110 may coordinate the acquisition of data from the various sensors of vehicles of the aerial vehicle fleet 102 in order to control the routing and operations of various vehicles of the ground vehicle fleet 104. The mobility network server(s) 110 likewise coordinate the acquisition of data from various sensors are vehicles of the ground vehicle fleet 104 in order to control the routing and operations of vehicles of the aerial vehicle fleet 102. For example, the mobility network server(s) 110 may control the acquisition of traffic monitoring data, by the aerial vehicle fleet 102, in order to assist in routing of vehicles of the ground vehicle fleet 104 by a routing engine that forms part of the mobility network server(s) 110.

The mobility network server(s) 110 is also coupled to an unmanned aerial vehicle traffic management system (UTM) 108, which operates to provide aircraft traffic management and de-confliction services to the aerial vehicle fleet 102. In one embodiment, the unmanned aerial vehicle traffic management system (UTM) 108 provides airspace management that various altitudes up to several thousand feet. The unmanned aerial vehicle traffic management system (UTM) 108 may also provide high-volume voiceless air traffic control interactions, and also integrates with air traffic control systems associated with airports. The mobility network server(s) 110 use connections provided by the unmanned aerial vehicle traffic management system (UTM) 108 to communicate with the vehicles of the aerial vehicle fleet 102, passing along routing and other information.

The acquisition of data for traffic monitoring, for example, by the aerial vehicle fleet 102 may be based on the aerial vehicles fly trips predetermined and/or optimized by an Unmanned Aerial System (UAS) traffic management (UTM) network. Connection to the unmanned aerial vehicle traffic management system (UTM) 108 is facilitated across multiple communications frequencies as needed for operation. Onboard telemetry of vehicles in the aerial vehicle fleet 102 is supplemented with GPS data in addition to other communication streams (GPS, 5G, etc.).

The unmanned aerial vehicle traffic management system (UTM) 108 is connected to the mobility network server(s) 110 that manage/oversee the operations of ground vehicles. This connection enables the multi modality of urban air mobility (UAM) trips as well as the transfer of data pertinent to ground operations (traffic, vehicle locations). The unmanned aerial vehicle traffic management system (UTM) 108 further communicates with third-party UAS Service Suppliers (USS) and supplemental data service providers (SDSPs) to facilitate the transfer of data to these third-party services.

The mobility network server(s) 110 further perform pre-determination and/or optimization of trips of the aerial vehicle fleet 102 are based, for example, on the payload to be transported from a departing location to an arrival location (e.g., vertiport, fiducial, ad-hoc location). For example, flights by the aerial vehicle fleet 102 may be optimized to increase overall throughput, and thus efficiency of the system. Aircraft 126 and vertical take-off and landing (VTOL) vehicles 115 may fly within dynamically allocated sky lanes which enable safe, dense operation at scale. Allocation of these sky lanes is determined by the mobility network server(s) 110 based on environmental acceptance (e.g., noise), weather, airspace deconfliction, and operational relevancy.

Figure 2:
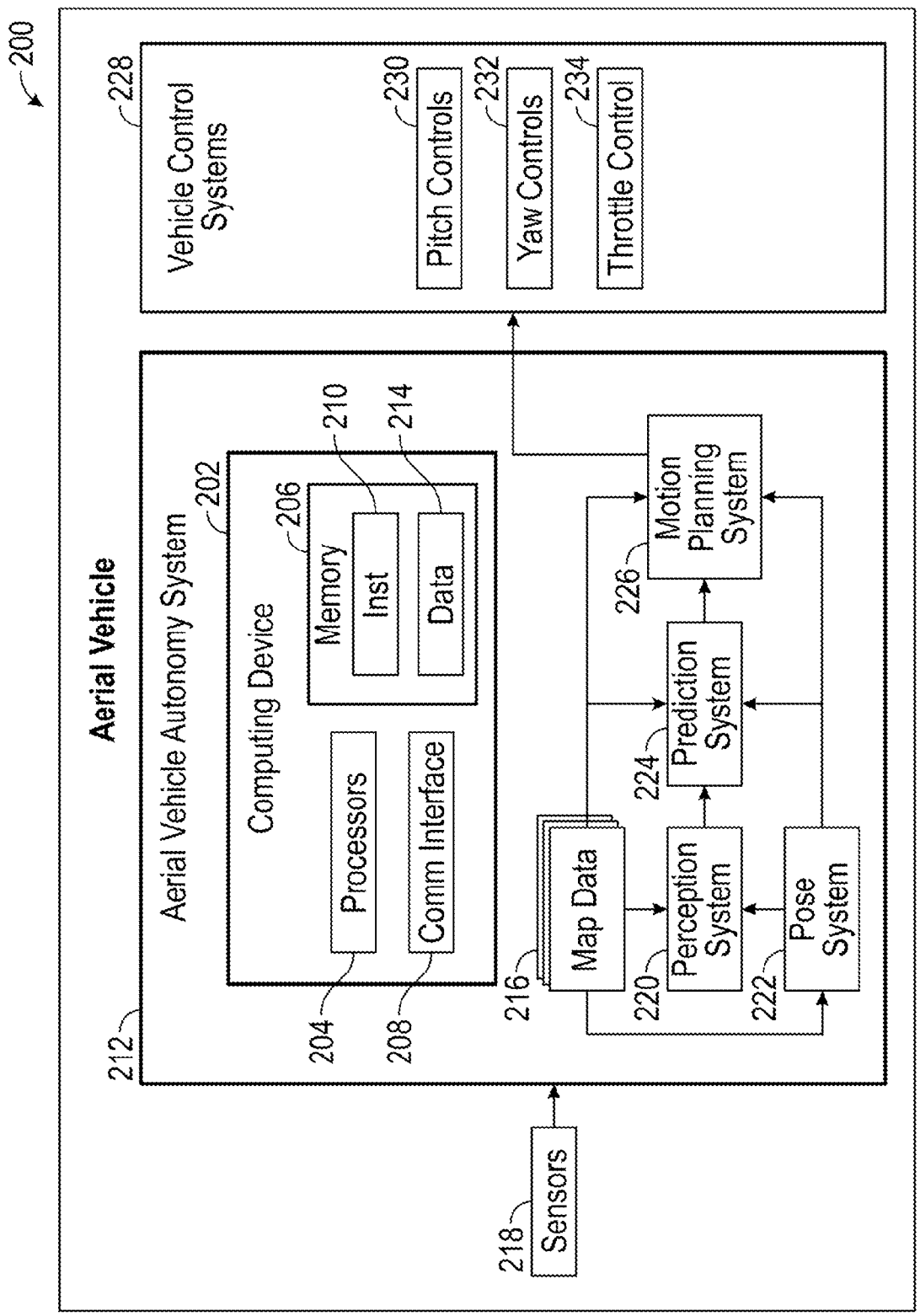
FIG. 2 is a diagrammatic representation of example mobility network server(s) operating within a networked environment.

FIG. 2 depicts a block diagram of an aerial vehicle 200, according to example aspects of the present disclosure. The aerial vehicle 200 can be, for example, be an autonomous or semi-autonomous aerial vehicle. The aerial vehicle 200 includes sensors 218, an aerial vehicle autonomy system 212, and the vehicle control systems 228.

The aerial vehicle autonomy system 212 can be engaged to control the aerial vehicle 200 or to assist in controlling the aerial vehicle 200. In particular, the aerial vehicle autonomy system 212 receives sensor data from the sensors 218, attempts to comprehend the environment surrounding the aerial vehicle 200 by performing various processing techniques on data collected by the sensors 218 and generates an appropriate motion path through an environment. The aerial vehicle autonomy system 212 provides instructions to the vehicle control systems 228 to operate the aerial vehicle 200 according to the motion path.

The aerial vehicle autonomy system 212 includes a perception system 220, a prediction system 224, a motion planning system 226, and a pose system 222 that cooperate to perceive the surrounding environment of the aerial vehicle 200 and determine a motion plan for controlling the motion of the aerial vehicle 200 accordingly.

Various portions of the aerial vehicle autonomy system 212 receive sensor data from the sensors 218. For example, the sensors 218 may include remote-detection sensors as well as motion sensors such as an inertial measurement unit (IMU), one or more encoders, etc. The sensor data can include information that describes the location of objects within the surrounding environment of the aerial vehicle 200, information that describes the motion of the vehicle, etc.

The sensors 218 may also include one or more remote-detection sensors or sensor systems, such as a LIDAR, a RADAR, one or more cameras, etc. As one example, a LIDAR system of the sensors 218 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, for a RADAR system of the sensors 218 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the sensors 218 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the sensors 218 can include a positioning system. The positioning system can determine a current position of the aerial vehicle 200. The positioning system can be any device or circuitry for analyzing the position of the aerial vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points, etc.) and/or other suitable techniques. The position of the aerial vehicle 200 can be used by various systems of the aerial vehicle autonomy system 212.

Thus, the sensors 218 can be used to collect sensor data that includes information that describes the location (e.g., in three-dimensional space relative to the aerial vehicle 200) of points that correspond to objects within the surrounding environment of the aerial vehicle 200. In some implementations, the sensors 218 can be located at various different locations on the aerial vehicle 200. As an example, one or more cameras, RADAR and/or LIDAR sensors.

The pose system 222 receives some or all of the sensor data from the sensors 218 and generates vehicle poses for the aerial vehicle 200. A vehicle pose describes the position (including altitude) and attitude of the vehicle. The position of the aerial vehicle 200 is a point in a three dimensional space. In some examples, the position is described by values for a set of Cartesian coordinates, although any other suitable coordinate system may be used. The attitude of the aerial vehicle 200 generally describes the way in which the aerial vehicle 200 is oriented at its position. In some examples, attitude is described by a yaw about the vertical axis, a pitch about a first horizontal axis and a roll about a second horizontal axis. In some examples, the pose system 222 generates vehicle poses periodically (e.g., every second, every half second, etc.) The pose system 222 appends time stamps to vehicle poses, where the time stamp for a pose indicates the point in time that is described by the pose. The pose system 222 generates vehicle poses by comparing sensor data (e.g., remote sensor data) to map data 216 describing the surrounding environment of the aerial vehicle 200.

In some examples, the pose system 222 includes localizers and a pose filter. Localizers generate pose estimates by comparing remote sensor data (e.g., LIDAR, RADAR, etc.) to map data. The pose filter receives pose estimates from the one or more localizers as well as other sensor data such as, for example, motion sensor data from an IMU, encoder, odometer, etc. In some examples, the pose filter executes a Kalman filter or other machine learning algorithm to combine pose estimates from the one or more localizers with motion sensor data to generate vehicle poses. In some examples, localizers generate pose estimates at a frequency less than the frequency at which the pose system 222 generates vehicle poses. Accordingly, the pose filter generates some vehicle poses by extrapolating from a previous pose estimate.

The perception system 220 detects objects in the surrounding environment of the aerial vehicle 200 based on the sensor data, the map data 216 and/or vehicle poses provided by the pose system 222. The map data 216, for example, may provide detailed information about the surrounding environment of the aerial vehicle 200. The map data 216 can provide information regarding: the identity and location of geographic entities, such as different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway; traffic control data (e.g., the location and instructions of signage, traffic lights, or other traffic control devices); and/or any other map data that provides information that assists the aerial vehicle autonomy system 212 in comprehending and perceiving its surrounding environment and its relationship thereto. The prediction system 224 uses vehicle poses provided by the pose system 222 to place aerial vehicle 200 environment.

In some examples, the perception system 220 determines state data for objects in the surrounding environment of the aerial vehicle 200. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the aerial vehicle 200; minimum path to interaction with the aerial vehicle 200; minimum time duration to interaction with the aerial vehicle 200; and/or other state information.

In some implementations, the perception system 220 can determine state data for each object over a number of iterations. In particular, the perception system 220 can update the state data for each object at each iteration. Thus, the perception system 220 can detect and track objects, such as vehicles, that are proximate to the aerial vehicle 200 over time.

The prediction system 224 is configured to predict future positions for an object or objects in the environment surrounding the aerial vehicle 200 (e.g., an object or objects detected by the perception system 220). The prediction system 224 can generate prediction data associated with objects detected by the perception system 220. In some examples, the prediction system 224 generates prediction data describing each of the respective objects detected by the perception system 220.

Prediction data for an object can be indicative of one or more predicted future locations of the object. For example, the prediction system 224 may predict where the object will be located within the next 5 seconds, 20 seconds, 200 seconds, etc. Prediction data for an object may indicate a predicted trajectory (e.g., predicted path) for the object within the surrounding environment of the aerial vehicle 200. For example, the predicted trajectory (e.g., path) can indicate a path along which the respective object is predicted to travel over time (and/or the speed at which the object is predicted to travel along the predicted path). The prediction system 224 generates prediction data for an object, for example, based on state data generated by the perception system 220. In some examples, the prediction system 224 also considers one or more vehicle poses generated by the pose system 222 and/or the map data 216.

In some examples, the prediction system 224 uses state data indicative of an object type or classification to predict a trajectory for the object. As an example, the prediction system 224 can use state data provided by the perception system 220 to determine that particular object (e.g., an object classified as a vehicle). The prediction system 224 can provide the predicted trajectories associated with the object(s) to the motion planning system 226.

In some implementations, the prediction system 224 is a goal-oriented prediction system that generates potential goals, selects the most likely potential goals, and develops trajectories by which the object can achieve the selected goals. For example, the prediction system 224 can include a scenario generation system that generates and/or scores the goals for an object and a scenario development system that determines the trajectories by which the object can achieve the goals. In some implementations, the prediction system 224 can include a machine-learned goal-scoring model, a machine-learned trajectory development model, and/or other machine-learned models.

The motion planning system 226 determines a motion plan for the aerial vehicle 200 based at least in part on the predicted trajectories associated with the objects within the surrounding environment of the aerial vehicle 200, the state data for the objects provided by the perception system 220, vehicle poses provided by the pose system 222, and/or the map data 216. Stated differently, given information about the current locations of objects and/or predicted trajectories of objects within the surrounding environment of the aerial vehicle 200, the motion planning system 226 can determine a motion plan for the aerial vehicle 200 that best navigates the aerial vehicle 200 relative to the objects at such locations and their predicted trajectories on acceptable roadways.

In some implementations, the motion planning system 226 can evaluate cost functions and/or one or more reward functions for each of one or more candidate motion plans for the aerial vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 226 can determine a total cost (e.g., a sum of the cost(s) and/or reward(s) provided by the cost function(s) and/or reward function(s)) of adhering to a particular candidate pathway. The motion planning system 226 can select or determine a motion plan for the aerial vehicle 200 based at least in part on the cost function(s) and the reward function(s). For example, the motion plan that minimizes the total cost can be selected or otherwise determined. The motion plan can be, for example, a path along which the aerial vehicle 200 will travel in one or more forthcoming time periods. In some implementations, the motion planning system 226 can be configured to iteratively update the motion plan for the aerial vehicle 200 as new sensor data is obtained from the sensors 218. For example, as new sensor data is obtained from the sensors 218, the sensor data can be analyzed by the perception system 220, the prediction system 224, and the motion planning system 226 to determine the motion plan.

Each of the perception system 220, the prediction system 224, the motion planning system 226, and the pose system 222, can be included in or otherwise a part of the aerial vehicle 200 configured to determine a motion plan based on data obtained from the sensors 218. For example, data obtained by the sensors 218 can be analyzed by each of the perception system 220, the prediction system 224, and the motion planning system 226 in a consecutive fashion in order to develop the motion plan. While FIG. 2 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 226 can provide the motion plan to vehicle control systems 228 to execute the motion plan. For example, the vehicle control systems 228 can include pitch control module 230, yaw control module 232, and a throttle control system 234, each of which can include various vehicle controls (e.g., actuators or other devices or motors that control power) to control the motion of the aerial vehicle 200. The vehicle control systems 228 can include one or more controllers, control devices, motors, and/or processors.

A throttle control system 234 is configured to receive all or part of the motion plan and generate a throttle command. The throttle command is provided to an engine and/or engine controller, or other propulsion system component to control the engine or other propulsion system of the aerial vehicle 200.

The aerial vehicle autonomy system 212 includes one or more computing devices, such as the computing device 202 which may implement all or parts of the perception system 220, the prediction system 224, the motion planning system 226 and/or the pose system 222. The example computing device 202 can include one or more hardware processors 204 and one or more memory devices (collectively referred to as memory 206). The memory 206 stores one or more of instructions 210 or data 214.

The one or more hardware processors 204 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 206 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 206 can store data 214 and instructions 210 which can be executed by the one or more hardware processors 204 to cause the aerial vehicle autonomy system 212 to perform operations. The computing device 202 can also include a communications interface 208, which can allow the computing device 202 to communicate with other components of the aerial vehicle 200 or external computing systems, such as via one or more wired or wireless networks. Additional descriptions of hardware and software configurations for computing devices, such as the computing device 202 are provided herein.

Figure 3:
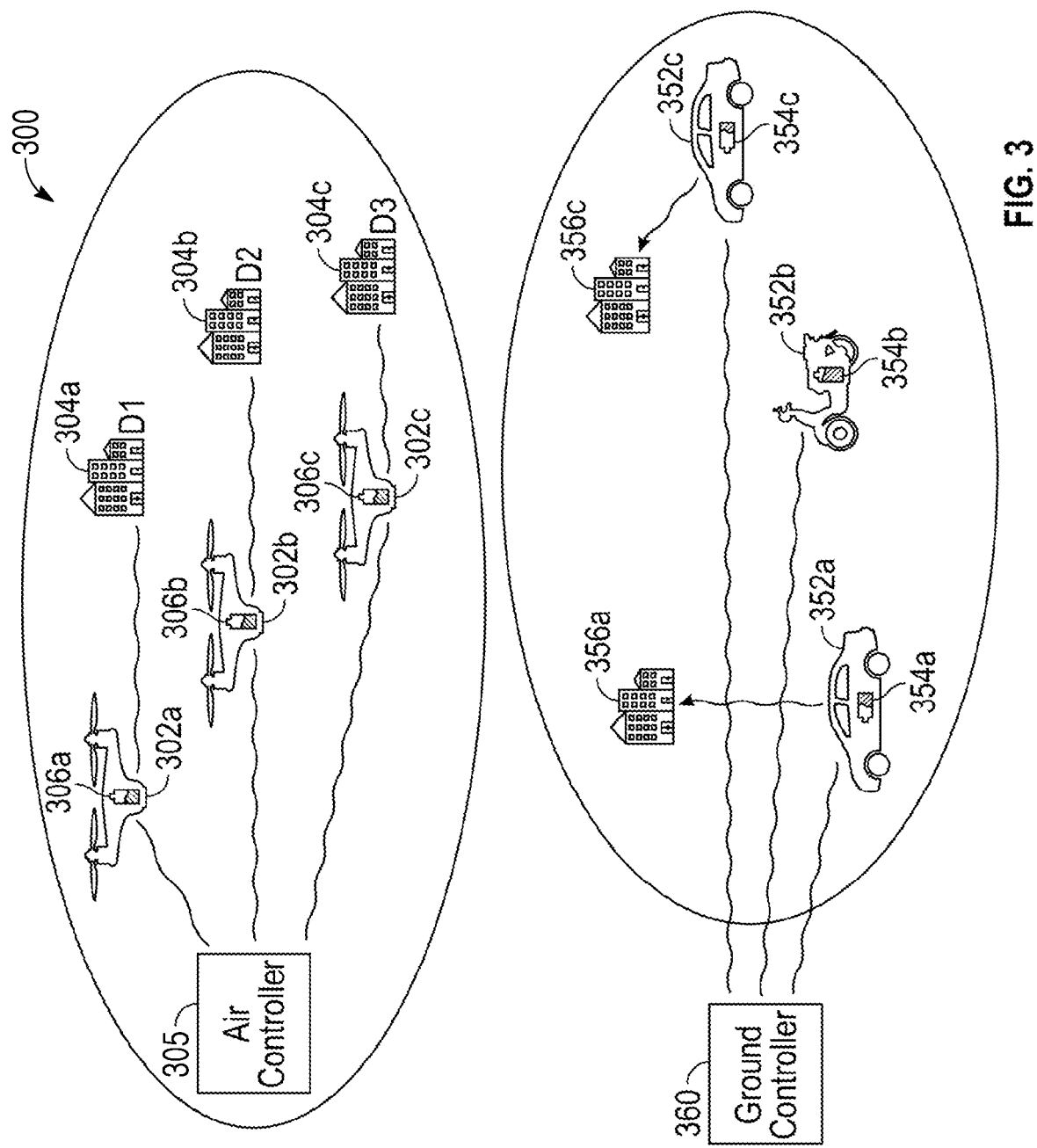
FIG. 3 is an overview diagram of an aerial drone network and a ground-based vehicle network.

FIG. 3 is an overview diagram showing an AAV network and a ground-based AV (GAV) network. The AAV network 300 is shown including three AAV's 302a-c. While three AAV's are shown in the AAV network 300, in various embodiments, any number of AAVs may be included in the AAV network 300. Each of the AAV's 302a-c is shown traveling to a separate destination 304a-c respectively. The AAV's 302a-c receive control instructions from an AAV network controller 305. The AAV network controller 305 monitors overall health of each of the AAV's 302a-c. Each of the AAV's is electrically powered and includes an on-board battery to power electric motors used for propulsion. The battery supplies electrical power for additional functions as well, such as to power wireless communication components (not shown) for communication with the AAV network controller 305.

A state of charge of each AAV's 302a-c on-board battery is shown with as charge states 306a-c respectively. The charge states 306a-c of each of the AAV's 302a-c are one component of health monitored by the AAV network controller 305. Other health parameters monitored include status information generated by diagnostic electronics on-board each of the AAV's 302a-c. This information may include operational status for one or more components of the respective AAV, such as status indicating whether electric motors and/or control surfaces are operating properly. In some aspects, the AAV network controller 305 may monitor the charge states 306a-c and detect when any one of the charge states 306a-c drops below a predetermined threshold level. In response to this detection, the AAV network controller 305 may task another AV with recharging the AV with the low charge state. Alternatively, the AAV network controller 305 may task the low charge AV with deviating to a recharge location.

The charge states 306a-c may be in excess of what is necessary for the respective AAV's 302a-c to travel to their respective destinations 304a-c. In some cases, one or more of the destinations 304a-c may have a capability to recharge an AAV upon its arrival at the destination. Thus, for AAV's destined for these types of destinations, the AAV may arrive with a battery close to empty and be fully recharged at the destination. Some other destinations have no local recharge capability. Thus, when traveling to these destinations, an AAV may be required to have some reserve battery capacity. This reserve capacity allows the AAV to travel to a recharge location after its arrival the destination.

The GAV network 350 is shown including three AV's, labeled as 352a-c. In various embodiments, any number of AV's may be included in the GAV network 350. Each of the GAV's 352a-c relies on an electrical battery for power. A state of charge of each of these batteries is shown as charge states 354a-c respectively. Each of the GAV's is shown traveling to a destination. For example, as shown in FIG. 3, the AV 352a is tasked with traveling to destination 356a. The AV 352c is shown traveling to the destination 356c. The GAV network 350 is controlled by a GAV network controller 360.

The disclosed embodiments seek to balance the charge state of the AAV's 302a-c of the AAV network 300 with the charge state of the GAV's 352a-c of the GAV network 350. Said balancing provides for improved operational efficiencies.

To achieve these operational efficiencies, the disclosed embodiments may calculate both costs and values provided by pairing two AV's to perform a recharging. Combinations of paired AV's may be generated and then evaluated based on the cost and value provided by the pair. The pairs are then ranked by their cost/value to determine which pairs will define recharge activity. Relatively higher value, lower cost pairings may provide benefits sufficient to justify the recharging.

A value created by providing charge by a first AV of the pair to a second AV of the pair may be based, in part, on additional range provided by the charge, which may enable the second AV to visit additional destinations than would otherwise be possible without a recharge. Costs associated with charging the second AV of the pair are also determined. Costs may be associated with modifications to an original route of travel and task assignment of the first AV. Recharging the second AV may also delay delivery of a payload carried by the first AV, cause the first AV to require an additional recharge itself, or may have other consequences. The determination of costs and values associated with pairings of AV's for recharging are discussed in more detail below.

In some embodiments, one or more of the AAV network controller 305 and/or a GAV network controller 360.

Figure 4B:
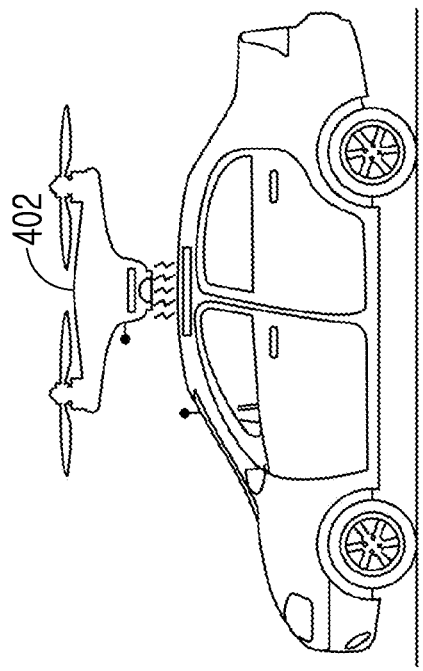
FIG. 4B shows the aerial drone and ground-based vehicle after the aerial drone has landed on a landing platform of the ground-based vehicle.
Figure 4A:
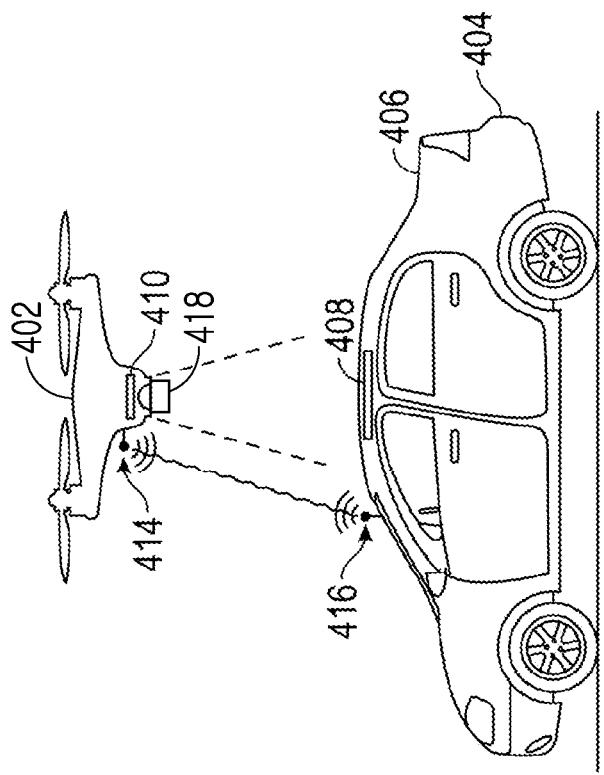
FIG. 4A shows one embodiment of an aerial drone and a ground-based vehicle.

FIG. 4A shows one embodiment of an AAV 402 and a GAV 404. The AAV 402 is positioning itself to land on the GAV 404. The GAV 404 includes a landing platform 406 to support the landing of the AAV 402. The GAV 404 is also equipped with an inductive charger 408. The AAV 402 is also equipped with an inductive charging receiver 418.

The AAV 402 is further equipped with at least one camera 410. The at least one camera 410 is used by the AAV 402 to image the GAV 404. Analysis of images of the GAV 404 may confirm an identification of the GAV 404 and or a position of the GAV 404. This analysis may further function to position the AAV 402 for landing on the landing platform 406. The AAV 402 is also equipped with wireless communications equipment, such as an antenna 414. The GAV 404 is also equipped with wireless communications equipment, including a second antenna 416.

The AAV 402 and GAV 404 communicate over wireless communications to exchange information. This information may include one or more of a vehicle identifier, current battery charge level, and recharging roles of the AAV 402 and/or GAV 404.

The recharging role indicates whether the vehicle provides charge or receives charge during a planned recharging event. The vehicle ID's may be used to confirm that the other vehicle is consistent with instructions received from an AV controller regarding the recharging event.

In some embodiments, additional information regarding one or more of one or more vehicle's orientation, position, or other characteristics may be exchanged such that each AV may confirm its counterpart is correctly configured for the recharge event before a landing of the AAV 402 occurs.

FIG. 4B shows the AAV 402 and GAV 404 after the AAV 402 has landed on the landing platform 406 of the GAV 404. The AAV 402 is shown positioned on the landing platform 406 such that the inductive charging receiver 418 of the AAV 402 is aligned with the inductive charger 408 of the GAV 404. After the AAV 402 is recharged by the GAV 404, the AAV 402 may lift off from the landing platform 406 and continue to a destination.

Figure 5:
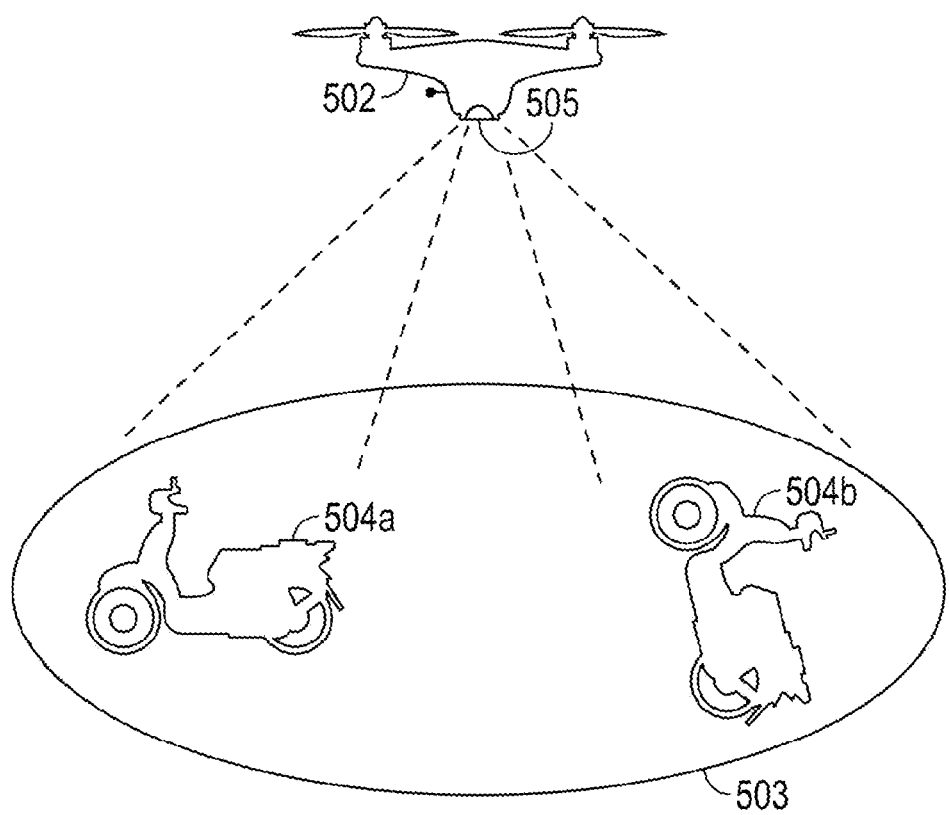
FIG. 5 shows an aerial drone positioned above a region including two vehicles.

FIG. 5 shows an embodiment of an AAV that may be implemented by one or more of the disclosed embodiments. FIG. 5 shows an AAV 502 that is positioned above a region 503 including two electric scooters 504*a-b*. The AAV 502 is imaging the region 503 via an imaging sensor 505.

The AAV 502 may have been dispatched to the region including the two electric scooters 504*a-b* to provide recharging services for one or more of the electric scooters 504*a-b*. Before landing, the AAV 502 may be configured to analyze one or more images captured by the imaging sensor 505. In some aspects, the imaging sensor 505 may be gimbled so as to change its field of view relative to the AAV 502. In other embodiments, the AAV 502 may be equipped with multiple imaging sensors to provide overlapping fields of view that span a larger portion of the region 503 proximate to the AAV 502 than could otherwise be provided by the imaging sensor 505.

The one or more captured images may represent a scene that includes one or more of the scooters 504*a-b*. The images are then analyzed to determine a health assessment of each of the scooters 504*a-b*. The health assessment may include, for example, whether a scooter has a flat tire, is missing any pieces, has any visible damage, and/or whether the scooter is in a proper orientation for recharging.

As shown in FIG. 5, the scooter 504*a* is shown in an upright position while the scooter 504*b* is shown laying on its side. In some conditions, the scooter 504*b* may be unable to be recharged in its current configuration. For example, if a recharging interface for the scooter 504*b* is on a right side of the scooter, access to the recharging interface may be obstructed when the scooter 504*b* is in the position as shown.

Analysis of the images captured by the AAV 502 may occur on board the AAV 502. Alternatively, the images may be transmitted wirelessly to a ground-based image analysis system. The analysis may identify whether each of the scooters 504*a-b* is in a position conducive to recharging via the AAV 502.

If a particular scooter (e.g. scooter 504*a* or scooter 504*b*) is not in a position conducive to charging by the AAV 502, a maintenance technician may be dispatched to the location in order to rectify the situation. Otherwise, the AAV 502 may land within the region 503 in a position to facilitate automated recharging of one or more of the scooters 504*a-b*.

Figure 6:
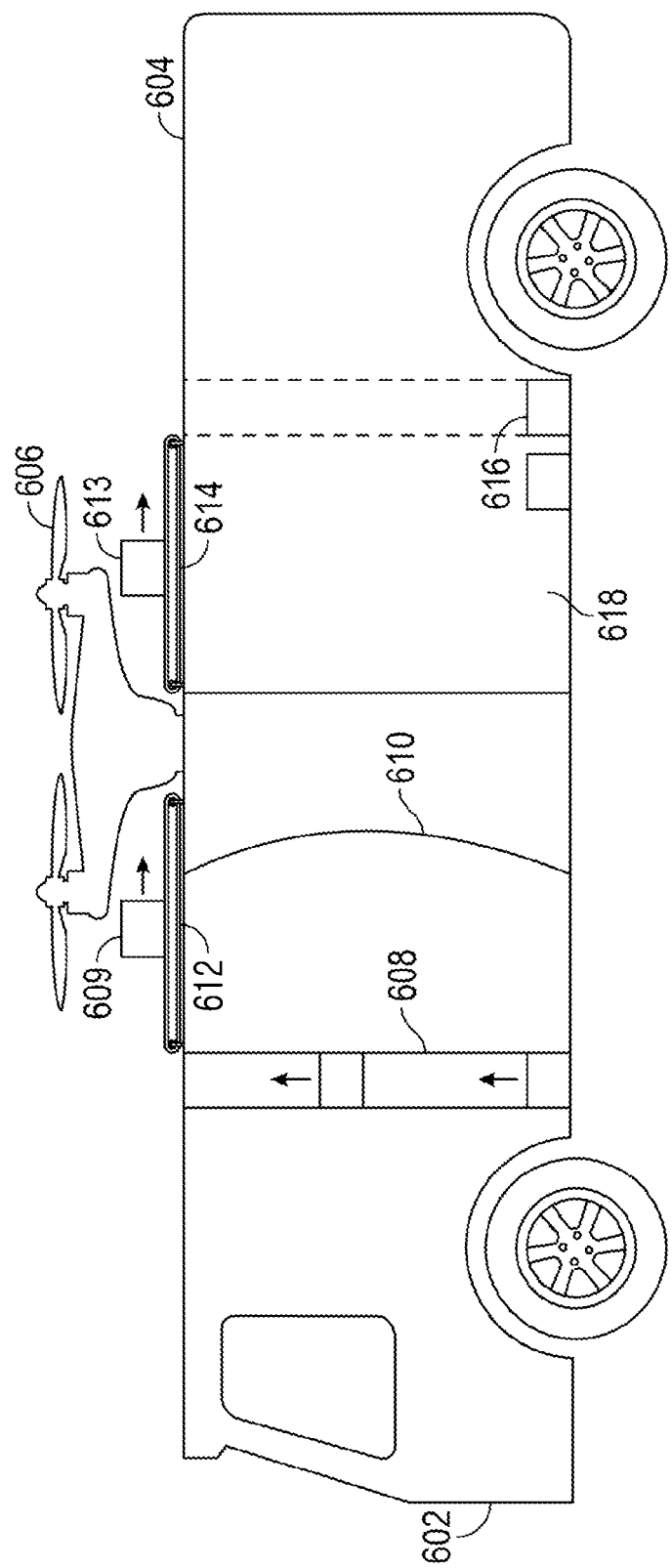
FIG. 6 shows an example embodiment of a ground-based vehicle that may be implemented in one or more of the disclosed embodiments.

FIG. 6 shows an example embodiment of a GAV that may be implemented in one or more of the disclosed embodiments. A GAV 602 is shown configured with a landing platform 604. An AAV 606 has landed on the landing platform 604. Also shown is a battery exchange system including several components. The battery exchange system includes an elevator 608 that moves a charged replacement battery 609 from a storage compartment 610 to the landing platform 604. The charged replacement battery 609 are moved via a conveyer 612 to the AAV 606. Empty or discharged batteries 613 are removed from the AAV 606 and moved via a second conveyer 614 to a second elevator 616 which returns the empty batteries to a second storage compartment 618. While the AAV 606 is being recharged by the GAV 602, the GAV 602 may perform a health assessment on the AAV 606. For example, the GAV 602 may collect information on any exceptions raised by a diagnostic system of the AAV 606. After the AAV 606 has been equipped with a charged replacement battery 609, the AAV 606 may depart from the landing platform 604.

Figure 7:
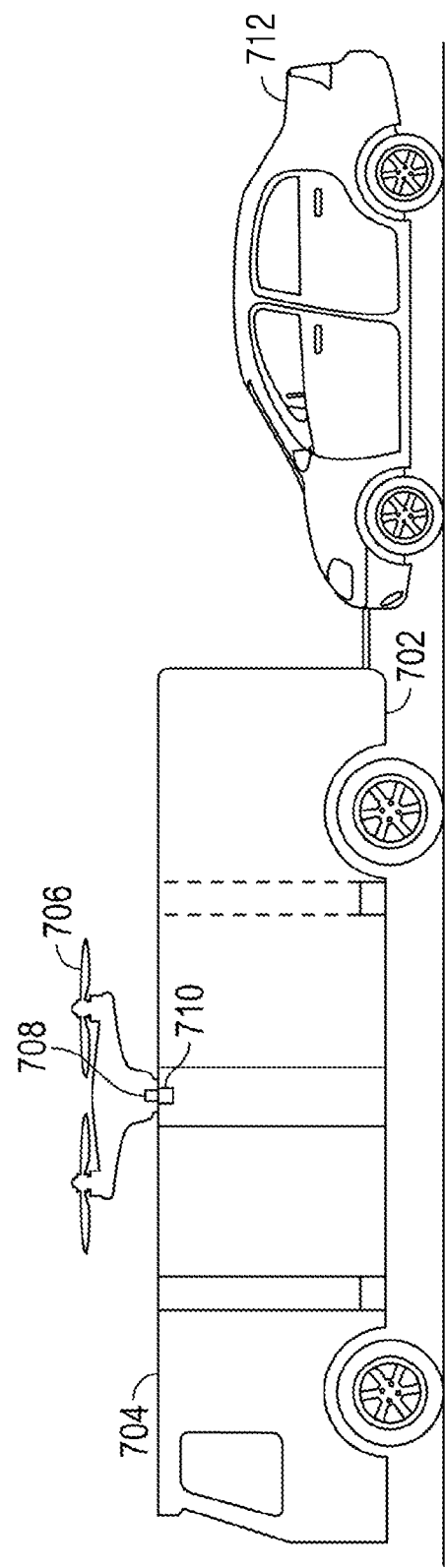
FIG. 7 shows a ground-based vehicle that may be implemented in one or more of the disclosed embodiments.

FIG. 7 shows a GAV 702. The GAV 702 includes a landing platform 704. As shown in FIG. 7, an AAV 706 has landed on the landing platform 704 and is docked, via a recharge port 708 to a recharge receptacle 710 of the GAV 702. When docked, the AAV 706 and GAV 702 may exchange health information. For example, the AAV 706 may communicate a charge status to the GAV 702 to facilitate recharging of the AAV 706 by the GAV 702. A second GAV 712 is also shown docked to the first GAV 702. Both the AAV 706 and the second GAV 712 are receiving charge from the GAV 702. In some cases, the GAV 702 is instructed to move to a location to facilitate the recharging of the AAV 706 and/or the GAV 712. For example, in some aspects, a preexisting range of the AAV 706 or GAV 712 may make it unable to reach a first location of the GAV 702. To facilitate a recharging, the GAV 702 is instructed to move to a second position within the range of the AAV 706 and/or GAV 712 as necessary to facilitate the recharging.

Figure 8:
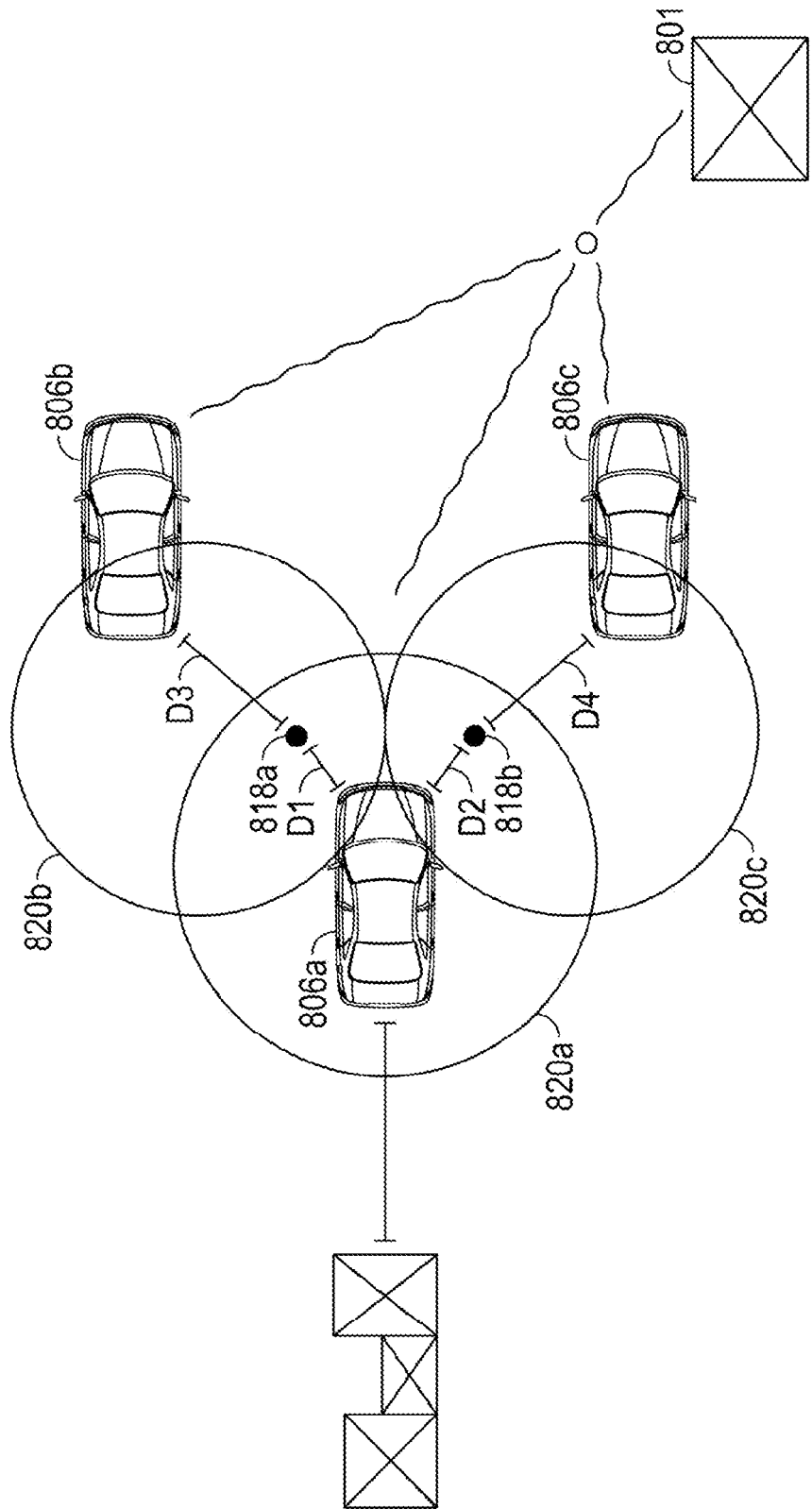
FIG. 8 illustrates two options for positioning two different recharge platforms to facilitate recharging of an aerial drone.

FIG. 8 illustrates an AV 806*a* that is low on charge and two recharge platforms 806*b-c* within a proximity of the AV 806*a*. The AV 806*a* is tasked with delivering a payload to a destination 801. The two recharge platforms 806*b* and 806*c* present two options for recharging of the AV 806*a*. While the AVs 806*a-c* are shown as a GAVs, the disclosed embodiments may also operate to similar affect with an AAV. With an existing level of charge, the AV 806*a* has a range 820*a*. Outside the range 820*a* of the AV 806*a* are the two recharge platforms 806*b* and 806*c*. The disclosed embodiments determine a strategy for recharging the AV 806*a* given the available recharge platforms 806*b* and 806*c*. For example, a distance between the AV 806*a* and each of the recharge platforms 806*b* and 806*c* are considered by at least some of the disclosed embodiments. These distances are shown as distances D1+D3 and D2+D4. A recharge capability of each of the recharge platforms 806*b* and 806*c* is also considered. Furthermore, a recharge capability of each of the recharge platforms 806*b* and 806*c* may be adjusted by a distance D3 and D4 respectively, since the recharge platforms 806*b* and 806*c* need to move distances D3 and D4 respectively to provide recharging at recharge locations 818*a* and 818*b* respectively in order to meet the AV 806*a* at recharge locations 818*a* or 818*b*.

A time required to recharge the AV 806*a* may also be considered. During a recharge activity for the AV 806*a*, the selected recharge platform (e.g. 806*b* or 806*c*) will be required to maintain a stable position. Furthermore, a charge state of the selected recharge platform 806*b* or 806*c* will be modified by the recharge activity. After recharging the AV 806*a*, the selected recharge platform will require enough range to reach either a fixed based recharge capability or a second recharge platform. Otherwise, the selected recharge platform may itself become in need of recharging. Thus, the disclosed embodiments may determine a range of the recharge platforms 806*b* and 806*c* after recharging of the AV 806*a*. These determined ranges may influence which recharge platform is better positioned to continue operation after the recharge of the AV 806*a* is completed. The ranges of recharge platforms 806*b* and 806*c* after recharging the AV 806*a* are shown in FIG. 8 as ranges 820*b* and 820*c* respectively. A center of each of the ranges 820*b* and 820*c* is located at the respective recharge location 818*a* and recharge location 818*b* respectively.

FIGS. 9A-B show two scenarios for multi-modal transport of a payload from an origin location to a destination location. A first scenario 900 shows a multi-modal transportation service from a source location 902 to a destination 904. A first leg of the transportation service utilizes an AAV 906 to carry a payload (not shown) from the source location 902 to a GAV 908. The GAV 908 includes a landing platform 910. The AAV 906 lands on the landing platform 910. The GAV 908 then travels to the destination 904 while carrying the AAV 906. The AAV controller 305 discussed above with respect to FIG. 3 may utilize the GAV 908 to transport the AAV 906 for a variety of reasons. In some aspects, the AAV 906 may have insufficient range to reach the destination 904. Thus, the AAV controller 305 may utilize the GAV 908 to augment the range of the AAV 906 such that the destination 904 is reached. The AAV controller 305 may alternatively utilize the GAV 908 to preserve a charge state of the AAV 906 during the travel to the destination 904. By relying on the GAV 908, a charge state of the AAV 906 may be maintained higher than would otherwise be the case if the AAV 906 traveled independently to the destination 904. This additional charge state resulting from use of the GAV 908 may be used to recharge another AV by the AAV 906, at least in some embodiments.

A second scenario 920 shown in FIG. 9B demonstrates a multi-modal transportation service from an origin location 922 to a destination location 936. The second scenario 920 shows that an AAV 924 has completed a first leg 926 of the multi-modal transportation service and has landed on a GAV 928, located at a first position 930. The GAV 928 then travels a distance D1 to a second position 932. During the travel of the GAV 928 from the first position 930 to the second position 932, the GAV 928 may recharge the AAV 924. The travel by the GAV from the first position 930 to the second position 932 also shortens a distance the AAV 924 must travel to reach the destination location 936 (by the distance DD. Upon reaching the second position 932, the AAV 924 lifts off from the GAV 928 and travels a second leg 934 of the transportation service to arrive at the destination location 936. Some of the disclosed embodiments may determine the distance D1 based on a range of the AAV 924. For example, in some aspects the distance D1 may be defined such that the GAV 928 approaches within a second distance of the destination location 936. The second distance is less than a range of the AAV 924 after being recharged by the GAV 928.

FIG. 10 shows an example of value provided by adding charge to an AV. FIG. 10 shows an AV 1002. Without recharging, the AV 1002 has a range within the region 1004. In the example of FIG. 10, the AV 1002 is tasked with traveling to a destination 1006, which is within the region 1004. The AV 1002 plans to travel to the destination 1006 via a route 1007. By adding additional charge, the range of the AV 1002 may be increased to the region shown by region 1008 or, with further additional charge, to the region 1010. A second destination 1012 within the region 1008, which the AV 1002 could reach with the additional charge. Arriving at the second destination 1012 may provide additional value relative to the value provided by the AV 1002 with the existing range represented by the region 1004. For example, the additional value includes an ability to reach the second destination 1012, which is not possible without the additional charge.

Increasing the range of the AV 1002 to the region 1008 requires the AV 1002 to recharge by traveling to a recharge location, indicated as 1014. Traveling to the recharge location 1014 requires the AV 1002 to deviate from its route 1007 to a longer route comprised of two legs 1016a and 1016b. A combined distance of route 1016a-b is longer than a distance of the route 1007.

This additional distance represents a cost of recharging the AV 1002. Additionally, a delay in arrival at the destination 1006 is introduced by first recharging the AV 1002 at the recharge location 1014. This delay is also a cost associated with recharging. Thus, to measure the benefit of increasing the range of the AV 1002 from the region 1004 to the region 1008, both the benefits and costs are considered. As discussed above, the benefits include an ability to reach the second destination 1012. This may provide for delivery of certain payload to the second destination 1012. Costs associated with recharging include the longer route 1016a-b (compared to the route 1007) and the additional delay caused by recharging.

FIG. 11 is a diagram showing a recharge event including a first AV being rerouted to provide charge to a second AV. While recharging the second AV may provide value by enabling the recharged second AV to travel to a larger number of destinations, tasking the first AV to act as a recharging platform for the second AV does have associated costs. These costs are considered by the disclosed embodiments before tasking the second AV.

As shown, a first AV 1102 is tasked with traveling to a destination 1104 via a route 1106. A second AV 1108 may be recharged by the first AV 1102. While a range of the second AV 1108 is limited, the second AV 1108 is able to travel to a recharge location 1110 along a route 1111 with an existing charge. To recharge the second AV 1108, the first AV 1102 deviates from a previously assigned route (e.g. route 1106) and travels to the recharge location 1110 via route 1112a. After the recharge operation has completed, the first AV 1102 travels along route 1112b to the destination 1104.

Costs associated with the illustrated recharge event at recharge location 1110 include the additional distance of 1112a-b compared to original route 1106. Additionally, the first AV 1102 is delayed from reaching its destination 1104 by at least a recharge time required to recharge the second AV 1108. Additional delay results from the additional distance traveled over route 1112a-b compared to 1106. Furthermore, the first AV 1102's charge state will be reduced upon arriving at the destination 1104 after recharging the second AV 1108, as compared to a second charge state resulting from direct travel to the destination 1104 via the route 1106. Additionally, there are costs associated with the second AV 1108. For example, the second AV 1108 travels to the recharge location 1110 via route 1111 in order to facilitate the recharge event. An elapsed time of the recharge event is also a cost incurred by the second AV 1108. One or more of the costs described above may be considered when determining whether to select the first AV 1102 to recharge the second AV 1108. For example, these costs may determine a portion of a cost/benefit analysis performed when ranking various combinations of recharge scenarios for a plurality of AVs, as described in more detail below.

FIG. 12 shows example data structures, one or more of which may be implemented in one or more of the disclosed embodiments. While the data structures illustrated in FIG. 12 are disclosed below as relational database tables, one of skill would understand that various embodiments may implement these data structures using other data storage architectures. For example, these data structures may be implemented as unstructured data, or as traditional memory based data structures such as arrays, linked lists, trees, or utilize any other data storage architecture.

FIG. 12 shows an AV table 1220, AV route table 1230, a route table 1240, a segment table 1250, and a recharge table 1260. The AV table 1220 includes an AV ID field 1222, AV type field 1223, last location field 1224, last location update time field 1226, a charge level field 1228, and a range field 1229. The AV ID field 1222 uniquely identifies a particular AV, and may be cross referenced with other AV ID fields discussed below. The AV type field 1223 identifies whether the AV is a AAV, GAV, Scooter, or other type of AV. The last location field 1224 indicates a location of the AV as indicated by a previous location update received from the AV. The last location update time field 1226 indicates a time of the last location update. The charge level field 1228 indicates a most recently reported charge level of the AV. For example, the charge level field 1228 indicates whether on-board batteries of the AV are 10% charged, 80% charged, etc. The range field 1229 indicates a range of the AV when the batteries are 100% charged.

The AV route table 1230 includes an AV id field 1232, route ID field 1234, origin field 1236, destination field 1237, payload field 1238, and an estimated time of arrival (ETA) field 1239. The AV id field 1232 uniquely identifies an AV. The route ID field 1234 uniquely identifies a route assigned to an AV identified by the AV id field 1232. The origin field 1236 identifies an origin location for the route. The destination field 1237 identifies a destination location for the route. A payload field 1238 includes data defining a payload carried by the AV (e.g. via the AV type field 1223) on the route (e.g. via route ID field 1234). The ETA field 1239 indicates an estimated time of arrival at the destination (e.g. via destination field 1237).

The route table 1240 includes a route identifier field 1242, segment identifier field 1244, and an order field 1246. The route identifier field 1242 uniquely identifies a particular route. The route identifier field 1242 may be cross referenced with the route ID field 1234. The segment identifier field 1244 uniquely identifies a portion of the route. For example, the segment identifier may define vector data defining a portion of a road and a direction on the road. The order field 1246 indicates where in the route (e.g. 1242), the segment (e.g. indicated in segment identifier field 1244) is located with respect to other segments.

The segment table 1250 includes a segment identifier field 1252, region identifier field 1254, and segment data field 1256. The segment identifier field 1252 uniquely identifies a particular segment, and may be cross referenced with the segment identifier field 1244 discussed above. The region identifier field 1254 uniquely identifies a region in the region table 1270, discussed below. The segment data field 1256 defines the segment identified by segment identifier 1252. For example, the segment data field 1256 may define vector information defining geographic location boundaries of the segment, and/or other segment characteristics.

The recharge table 1260 includes a recharge task identifier 1261, recharge location field 1262, recharging AV id field 1263, recharged AV id field 1264, recharging AV id field 1265, a recharged AV route identifier field 1266, and a recharge amount field 1268. The recharge task identifier field 1261 uniquely identifies a particular recharge task. In particular, once a pair of AV's are selected to perform a recharge event, a recharge task is allocated to the recharge table 1260 in some embodiments to manage the recharge event. The recharge location field 1262 indicates a geographic location where the recharge event takes place between the two AVs. The recharging AV id field 1263 indicates an identifier of an AV that will provide charge during the recharge event (a first AV of the selected pair). The recharging AV id field 1263 may be cross referenced with AV ID field 1222 and/or the AV ID field 1232. The recharged AV id field 1264 identifies an AV that will receive charge during the recharge event (a second AV of the selected AV pair). The recharging AV id field 1265 indicates a route the recharging AV (identified via recharging AV id field 1263) will take to a recharge location indicated by the recharge location field 1262. The recharged AV route id field 1266 indicates a route the recharged AV (identified via field 1264) will take to the recharge location field 1262. The recharge amount field 1268 defines an amount of charge to be transferred from the recharging AV (identified via the recharging AV id field 1263) to the recharged AV (identified via field 1264).

The region table 1270 defines geographic regions. The region identifier field 1272 uniquely identifies a particular region. The geographic boundaries field 1274 identifies geographic boundaries of a region identified by the region identifier field 1272.

FIG. 13 is a flowchart of a process for recharging an autonomous vehicle. In some aspects, one or more of the functions discussed below with respect to FIG. 13 may be performed by hardware processing circuitry. For example, instructions stored in one or more hardware memories may configure the hardware processing circuitry to perform one or more of the functions discussed below. In some aspects, the process 1300 may be performed by an AV controller, such as one or more of the AAV network controller 305, and/or the GAV network controller 360.

Process 1300 discussed below operates on pairs of AVs. For example, process 1300 may generate all possible combination of AV pairs from a plurality of AVs managed by the disclosed embodiments. As one example, the pairs of AV's may include possible combinations of AV's from the AAV network 300 and/or from the GAV network 350. Order of the AV's in a pair identifies a role each AV plays in a recharging event between the pair. For example, a pair ($AV_1$, $AV_2$) may indicate that $AV_1$ adds charge to $AV_2$). Thus, when generating all combinations, both ($AV_1$, $AV_2$) and ($AV_2$, $AV_1$) may be generated. Values and costs of each pair may then be determined by the disclosed embodiments. Pairs identifying the most value while considering the cost may be selected by the disclosed embodiments. Recharge events defined by the selected pairs may then be executed by the disclosed embodiments.

In operation 1305, recharge values associated with the generated AV pairs are determined. Operation 1305 determines a value associated with a particular AV pair when a first AV of the pair provides charge to a second AV of the pair. Determining a value for a particular recharge pair may include determining a location the recharge event between the pair is performed. The location may be determined such that the location falls within a range of the first AV and a range of the second AV. In some cases, the location may fall on a line between current locations of the two AV's. In some embodiments, each AV's destination after the recharge may also be considered in selecting the location for the recharge event. Each of the values are evaluated with respect to the determined recharge location.

As discussed above with respect to the example of FIG. 6 and/or FIG. 8, value associated with adding charge to an autonomous vehicle can include value provided by the recharged autonomous vehicle (e.g. the "second" AV discussed above) being capable of reaching additional destinations associated with a longer range provided by the additional charge. These additional destinations may provide opportunities to pick-up and/or drop-off one or more payloads by the AV. This additional payload delivery capability provides incremental value when compared to a baseline level of operation that may occur without additional charge.

In operation 1310, costs associated with tasking a second AV of each pair with the recharging defined by the pair is determined. As discussed above with respect to FIGS. 8 and 11, costs associated with tasking the first AV to recharge the second AV may include an increased distance the first AV and/or second AV must travel to facilitate the recharging event at the determined recharge location, a delay in one or more of the first AV and/or second AV in reaching a destination associated with an existing assigned task (e.g. destination 1104), and a reduced charge for the recharging AV (e.g. first AV 1102) when reaching its destination.

In operation 1315 the value of each recharging pair is ranked against a cost associated with the recharging pair. In some aspects, pairs of AV's may be ranked based on the value provided by the pair. The pairs of AVs may also be ranked separately based on costs associated with the recharging. In some aspects, the cost of the pair may be subtracted from the value provided by the pair, providing a net value of each pair. The net values may then be ranked.

In operation 1320, AV pairings having a value (e.g. net value) above a threshold may be selected for implementation. In some aspects, some of the selected pairings may be mutually exclusive. For example, two selected pairs may rely on the same AV for providing charge to two different AV's at two different recharge locations. Thus, these mutually exclusive pairs may be pruned by eliminating all but one of the mutually exclusive pairs from the selected set of pairs. The pruning may eliminate all pairs except the highest value pair in some aspects.

In operation 1325, the selected pairs of AV's are instructed to perform the recharge pairing defined by the pair. As discussed above with respect to FIG. 11, a first (recharging) AV of the pair (e.g. second AV 1108) is instructed to move to a recharge location (e.g. 1110). Similarly, a second AV of the pair that will provide charge is instructed to move to the recharge location. Once both AVs of a pair arrive at their respective recharge location, docking may occur. For example, the docking may occur via inductive charging described above with respect to FIGS. 4A-B, or via hard docking as described above with respect to FIG. 7, or a battery replacement such as described above with respect to FIG. 6 may be performed to "recharge" the first AV. Once the identified amount of charge has been transferred from the first AV (recharging AV) to the second AV (charged AV), (for example, as defined by recharge amount field 1268), each AV may depart the recharge location for a subsequent destination.

FIG. 14 is a flowchart of a process for determining a value of adding charge to an autonomous vehicle. In some aspects, one or more of the functions discussed below with respect to FIG. 14 may be performed by hardware processing circuitry. For example, instructions stored in one or more hardware memories may configure the hardware processing circuitry to perform one or more of the functions discussed below. In some aspects, the process 1400 may be performed by an AV controller, such as one or more of the AAV network controller 305, and/or the GAV network controller 360.

In operation 1405, a range of the AV is determined. The range is based on a current state of charge of the AV (e.g. 1228). For example, as discussed above with respect to FIG. 3, each of the AV's in the AAV network 300 and the GAV network 350 have a state of charge, shown as 306a-c and 354a-c. The state of charge, along with other factors, such as a weight of the respective AV, weather conditions, and other factors, determine a range of the respective AV. An example range of an AV is shown above with respect to FIG. 10, with a range given based on the region 1004. A range may be the radius of the region 1004 (or 1008, or 1010).

In operation 1410, a set of first destinations within the range are determined. Each of those first destinations have a value associated with the AV reaching that destination. For example, as discussed above with respect to FIG. 10, the destination 1006 is within the range of the AV 1002, as demonstrated by a radius of the region 1004.

In operation 1420, a second set of destinations within an increased range are determined. Based on the second set of destinations, a second value is determined. The second value may be based on value provided by the AV picking up and/or dropping off payloads at one or more of the second destinations. For example, as discussed above with respect to FIG. 10, an increased range is associated with the region 1008 compared to an original range associated with the original region 1004. The region 1008 includes the second destination 1012, which is not included in the original region 1004. In this example, operation 1420 determines a value associated with the AV 1002 visiting the second destination 1012 to either drop off or pick-up a payload. The additional value may also or alternatively be associated with a further ability to add charge to the AV 1002 at the second destination 1012.

In operation 1430, a difference between the first value and the second value is determined. This difference represents an incremental value provided by an increased range. The increased range is made available based on the recharging.

In operation 1435, a value of the recharge is determined based on the difference.

FIG. 15 is a flowchart for a process of determining a cost of providing a charge by a first AV to a second AV. One or more of the functions discussed below with respect to FIG. 15 may be performed by hardware processing circuitry. For example, instructions stored in a memory may configure the hardware processing circuitry to perform one or more of the functions discussed below with respect to FIG. 15.

Process 1500 discussed below with respect to FIG. 15 refers to a pair of autonomous vehicles. As discussed above, a first AV of the pair would, if the pair is selected, provide additional charge to a second AV of the pair. The providing of this additional charge is considered a recharge event for the pair of AVs. The disclosed embodiments may generate multiple combinations of AVs, represented as multiple AV pairs. The pairs are evaluated first individually, to determine costs and benefits of a specific pairing, and then as a group to determine which of the pairs represent superior value compared to other pairs. Those pairs of AV's representing the best value may be selected by the disclosed embodiments. The selected pairs may then be instructed to execute their respective recharge events. Process 1500 evaluates a cost associated with providing charge by a first AV of a pair to a second AV of the pair.

In operation 1505, incremental distances traveled by each AV of an AV pair is determined. Each incremental distance is that distance necessary for an AV of the pair to arrive at a recharge location for a recharge event between the two AVs of the pair. As discussed above with respect to FIG. 11, each AV of an av pair (e.g. AV's 1102 and 1108) may travel different distances to a recharge location (e.g. 1110). These distances may represent a deviation from an existing route (e.g. 1106) to a destination (e.g. destination 1104). The distance for a particular AV may include a distance to the recharge location (e.g. 1112a) as well as a second distance of additional travel necessary to recover from the recharge event and continue any previous tasks (e.g. route 1112b). Thus, the incremental distance represents a difference between a first distance traveled by the AV without a recharge event, and a second distance traveled for the AV to participate in the recharge event. The distance to participate in the recharge event may include a first distance to travel to the recharge event, and then a second distance to travel to an original destination of the AV (as defined by an original tasking) (e.g. 1112a+1112b–1106 of FIG. 11).

In operation 1510, delays experienced by each of the AV's in the AV pair are determined. In some aspects, the delays may be based on the incremental distance traveled as determined by operation 1505. Additionally, the delays may be based on an amount of charge to be delivered to the first AV by the second AV.

In operation 1515, a reduced charge level for the first AV (the AV providing the charge) when arriving at its original destination (e.g. destination 1104) is determined. This reduced charge level may be based on the incremental distance the first AV needs to travel to support the recharge event, and the amount of charge received by the second AV (generally proportional to the recharge time or delay discussed above with respect to operation 1510).

In operation 1520, a cost associated with the recharge event is determined. The determination is based on the delays, the incremental distance traveled, and the reduced charge level of the first AV.

FIG. 16 is a flowchart for a process of performing a health assessment of a vehicle. One or more of the functions discussed below with respect to FIG. 16 may be performed by hardware processing circuitry. For example, instructions stored in a memory may configure the hardware processing circuitry to perform one or more of the functions discussed below with respect to FIG. 16.

In operation 1605, an image is captured. In some aspects, the image is captured by an imaging sensor of an autonomous vehicle. In some aspects, the autonomous vehicle may be an AAV. Alternatively, the autonomous vehicle may be a GAV. The captured image represents a scene that includes a rechargeable vehicle. For example, as discussed above with respect to FIG. 5, in some embodiments, an autonomous vehicle, such as the AAV 502, may capture an image including the region 503. Within the region 503 are two autonomous vehicles.

In operation 1610, an orientation of the vehicle is determined based on the image. For example, again as discussed above with respect to FIG. 5, a vehicle represented by the captured image may be in a variety of orientations. Analysis of the image is performed to determine which orientation the vehicle is in. For example, as discussed above with respect to FIG. 5, the scooter 504a is in an upright position, while the scooter 504b is laying on its side. The analysis of the image in operation 1610 determines these orientations.

Decision operation 1615 determines whether the orientation is compatible with recharging of the vehicle. For example, the orientation of the scooter 504a shown in FIG. 5 may be compatible with recharging, because a recharging port or interface for the scooter is accessible to the AAV 502 in scooter 504a orientation. Thus, in the case of scooter 504a, process 1600 moves from decision operation 1615 to operation 1620, discussed below.

In contrast to the analysis of scooter 504a, the orientation of the scooter 304b is not compatible with recharging, as a recharging interface or port positioned on a right side of the scooter 504b is inaccessible to the AAV 502 in the illustrated orientation. Thus, in the case of scooter 504b, process 1600 moves from decision operation 1615 to operation 1635, which request manual intervention to correct the orientation of the vehicle.

Returning to operation 1620, a health of the vehicle is determined. Vehicle health determination may vary based on the type of vehicle being assessed. With respect to an electric scooter as illustrated in FIG. 5, the health assessment may determine whether the scooter has any missing parts. For example, the health assessment may analyze the captured image to determine if the scooter still includes one or more of both tires, lights necessary to operate legally, a handlebar, or a seat. The health assessment may further assess an inflation level of the tires. Flat tires may be detected in some circumstances. For example, if a scooter is positioned such that weight is placed on the tires, an amount of deflection of the tire surface at a contact point may be analyzed to determine an inflation level of the tires.

Decision operation 1625 determines if the health assessed by operation 1620 is compatible with a recharging event. Decision operation 1625 may be based on one or more criterion. For example, a criterion may specify a minimum level of tire inflation required for the vehicle to be recharged. Similarly, vehicles missing parts may be disqualified from being recharged. If the health assessment of the vehicle indicates the vehicle is not compatible with a recharge event, process 1600 moves from decision operation 1625 to operation 1635, which requests manual intervention. Otherwise, process 1600 moves to operation 1630, which proceeds with an automated recharging.

To perform an automated recharging, in some aspects, an AAV may position itself within a threshold distance of the vehicle. The AAV may be further positioned so as to align an inductive charging device of the AAV to align with an inductive charge receiver of the vehicle. A recharge of the vehicle is then performed.

FIG. 17 is a block diagram showing one example of a software architecture 1700 for a computing device. The software architecture 1702 may be used in conjunction with various hardware architectures, for example, as described herein. FIG. 17 is merely a non-limiting example of a software architecture 1702 and many other architectures may be implemented to facilitate the functionality described herein. A representative hardware layer 1704 is illustrated and can represent, for example, any of the above-referenced computing devices. In some examples, the hardware layer 1704 may be implemented according to an architecture 1800 of FIG. 18 and/or the software architecture 1702 of FIG. 17.

The representative hardware layer 1704 comprises one or more processing units 1706 having associated executable instructions 1708. The executable instructions 1708 represent the executable instructions of the software architecture 1702, including implementation of the methods, modules, components, and so forth of FIGS. 1-16. The hardware layer 1704 also includes memory and/or storage modules 1710, which also have the executable instructions 1708. The hardware layer 1704 may also comprise other hardware 1712, which represents any other hardware of the hardware layer 1704, such as the other hardware illustrated as part of the software architecture 1700.

In the example architecture of FIG. 17, the software architecture 1702 may be conceptualized as a stack of layers where each layer provides particular functionality. For example, the software architecture 1702 may include layers such as an operating system 1714, libraries 1716, frameworks/middleware 1718, applications 1720, and a presentation layer 1744. Operationally, the applications 1720 and/or other components within the layers may invoke API calls 1724 through the software stack and receive a response, returned values, and so forth illustrated as messages 1726 in response to the API calls 1724. The layers illustrated are representative in nature and not all software architectures have all layers. For example, some mobile or special-purpose operating systems may not provide a frameworks/ middleware 1718 layer, while others may provide such a layer. Other software architectures may include additional or different layers.

The operating system 1714 may manage hardware resources and provide common services. The operating system 1714 may include, for example, a kernel 1728, services 1730, and drivers 1732. The kernel 1728 may act as an abstraction layer between the hardware and the other software layers. For example, the kernel 1728 may be responsible for memory management, processor management (e.g., scheduling), component management, networking, security settings, and so on. The services 1730 may provide other common services for the other software layers. In some examples, the services 1730 include an interrupt service. The interrupt service may detect the receipt of a hardware or software interrupt and, in response, cause the software architecture 1702 to pause its current processing and execute an ISR when an interrupt is received. The ISR may generate an alert.

The drivers 1732 may be responsible for controlling or interfacing with the underlying hardware. For instance, the drivers 1732 may include display drivers, camera drivers, Bluetooth® drivers, flash memory drivers, serial communication drivers (e.g., Universal Serial Bus (USB) drivers), WiFi® drivers, NFC drivers, audio drivers, power management drivers, and so forth depending on the hardware configuration.

The libraries 1716 may provide a common infrastructure that may be used by the applications 1720 and/or other components and/or layers. The libraries 1716 typically provide functionality that allows other software modules to perform tasks in an easier fashion than by interfacing directly with the underlying operating system 1714 functionality (e.g., kernel 1728, services 1730, and/or drivers 1732). The libraries 1716 may include system libraries 1734 (e.g., C standard library) that may provide functions such as memory allocation functions, string manipulation functions, mathematic functions, and the like. In addition, the libraries 1716 may include API libraries 1736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1716 may also include a wide variety of other libraries 1738 to provide many other APIs to the applications 1720 and other software components/modules.

The frameworks 1718 (also sometimes referred to as middleware) may provide a higher-level common infrastructure that may be used by the applications 1720 and/or other software components/modules. For example, the frameworks 1718 may provide various graphical user interface (GUI) functions, high-level resource management, high-level location services, and so forth. The frameworks 1718 may provide a broad spectrum of other APIs that may be used by the applications 1720 and/or other software components/modules, some of which may be specific to a particular operating system or platform.

The applications 1720 include built-in applications 1740 and/or third-party applications 1742. Examples of representative built-in applications 1740 may include, but are not limited to, a contacts application, a browser application, a book reader application, a location application, a media application, a messaging application, and/or a game application. The third-party applications 1742 may include any of the built-in applications 1740 as well as a broad assortment of other applications. In a specific example, the third-party application 1742 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1742 may invoke the API calls 1724 provided by the mobile operating system such as the operating system 1714 to facilitate functionality described herein.

The applications 1720 may use built-in operating system functions (e.g., kernel 1728, services 1730, and/or drivers 1732), libraries (e.g., system libraries 1734, API libraries 1736, and other libraries 1738), or frameworks/middleware 1718 to create user interfaces to interact with users of the system. Alternatively, or additionally, in some systems, interactions with a user may occur through a presentation layer, such as the presentation layer 1744. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 17, this is illustrated by a virtual machine 1748. A virtual machine creates a software environment where applications/modules can execute as if they were executing on a hardware computing device. The virtual machine 1748 is hosted by a host operating system (e.g., the operating system 1714) and typically, although not always, has a virtual machine monitor 1746, which manages the operation of the virtual machine 1748 as well as the interface with the host operating system (e.g., the operating system 1714). A software architecture executes within the virtual machine 1748, such as an operating system 1750, libraries 1752, frameworks/middleware 1754, applications 1756, and/or a presentation layer 1758. These layers of software architecture executing within the virtual machine 1748 can be the same as corresponding layers previously described or may be different.

FIG. 18 is a block diagram illustrating a computing device hardware architecture 1800, within which a set or sequence of instructions can be executed to cause a machine to perform examples of any one of the methodologies discussed herein. The hardware architecture 1800 describes a computing device for executing the vehicle autonomy system, described herein.

The architecture 1800 may operate as a standalone device or may be connected (e.g., networked) to other machines. In a networked deployment, the architecture 1800 may operate in the capacity of either a server or a client machine in server-client network environments, or it may act as a peer machine in peer-to-peer (or distributed) network environments. The architecture 1800 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1800 includes a processor unit 1802 comprising at least one processor (e.g., a central processing unit (CPU), a graphics processing unit (GPU), or both, processor cores, compute nodes). The architecture 1800 may further comprise a main memory 1804 and a static memory 1806, which communicate with each other via a link 1808 (e.g., bus). The architecture 1800 can further include a video display unit 1810, an input device 1812 (e.g., a keyboard), and a UI navigation device 1814 (e.g., a mouse). In some examples, the video display unit 1810, input device 1812, and UI navigation device 1814 are incorporated into a touchscreen display. The architecture 1800 may additionally include a storage device 1816 (e.g., a drive unit), a signal generation device 1818 (e.g., a speaker), a network interface device 1820, and one or more sensors (not shown), such as a Global Positioning System (GPS) sensor, compass, accelerometer, or other sensor.

In some examples, the processor unit 1802 or another suitable hardware component may support a hardware interrupt. In response to a hardware interrupt, the processor unit 1802 may pause its processing and execute an ISR, for example, as described herein.

The storage device 1816 includes a machine-readable medium 1822 on which is stored one or more sets of data structures and instructions 1824 (e.g., software) embodying or used by any one or more of the methodologies or functions described herein. The instructions 1824 can also reside, completely or at least partially, within the main memory 1804, within the static memory 1806, and/or within the processor unit 1802 during execution thereof by the architecture 1800, with the main memory 1804, the static memory 1806, and the processor unit 1802 also constituting machine-readable media.

Executable Instructions and Machine-Storage Medium

The various memories (i.e., 1804, 1806, and/or memory of the processor unit(s) 1802) and/or storage device 1816 may store one or more sets of instructions and data structures (e.g., instructions) 1824 embodying or used by any one or more of the methodologies or functions described herein. These instructions, when executed by processor unit(s) 1802 cause various operations to implement the disclosed examples.

As used herein, the terms "machine-storage medium," "device-storage medium," "computer-storage medium" (referred to collectively as "machine-storage medium 1822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1822 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1824 can further be transmitted or received over a communications network 1826 using a transmission medium via the network interface device 1820 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

FIG. 19 shows example data structures that may be implemented in one or more of the disclosed embodiments. While the example data structures are described below as relational database tables, one of skill would understand that a variety of data structure techniques could be used by the disclosed embodiments. In some embodiments for example, the data structures may be implemented in an unstructured data store, as traditional memory data structures such as linked lists, trees, queues, or other types of structures.

FIG. 19 shows a payload table 1900 and an AV cost table 1920. The payload table 1900 includes a payload identifier field 1902, origin filed 1904, destination field 1906, payload size field 1907, assigned AV identifier field 1908, delivery benefit or weight field 1910, delivery deadline field 1912, and a delay cost or weight per unit of time field 1914. The payload identifier field 1902 uniquely identifies a particular payload. The origin field 1904 identifies an origin of the payload. The origin may identify a pick-up location of the payload. The destination field 1906 identifies a geographic location of a destination for the payload. The payload size field 1907 identifies one or more of a weight of the payload and/or dimensions of the payload. The payload size field 1907 may be used by the disclosed embodiments to determine a proper AV to carry the payload. The assigned AV identifier field 1908 identifies an AV assigned to carry the payload. When the payload is not yet assigned, the assigned AV identifier field 1908 may be set to a predetermined value indicating same. The delivery benefit or weight field 1910 indicates a positive weight or value provided when the payload is delivered to the destination. The delivery benefit or weight field 1910 may be used by the disclosed embodiments when determining a value provided by delivery of the payload. The delivery deadline field 1912 indicates a time before which the payload is delivered without any cost penalty. The delay cost or weight per unit of time field 1914 indicates a delivery cost penalty associated with delivery of the payload. The delay cost or weight per unit of time field 1914 may be used by the disclosed embodiments when considering whether to, for example, re-task an AV carrying the payload (identified by the payload identifier field 1902) so as to provide additional charge to a second AV.

The AV cost table 1920 includes an AV identifier field 1922, payload capacity field 1924, range field 1926, charge level field 1928, current location field 1930, travel speed field 1931, asset cost per time unit field 1932, and per distance unit cost field 1934. The AV identifier field 1922 stores a value that uniquely identifies an autonomous vehicle. The payload capacity field 1924 stores a value indicating a maximum payload capacity of the AV. The capacity may be indicated in terms of weight and/or dimensions. In some aspects, the payload capacity field 1924 for a particular AV may be compared to the payload size field 1907 of a particular payload to determine if the AV is a good fit for the payload. The range field 1926 indicates a range of the AV when fully charged. The charge level field 1928 indicates a current charge level of the AV. The current location field 1930 indicates a current location of the AV. The travel speed field 1931 indicates an average speed the AV travels when moving a payload to a destination. The asset cost per time unit field 1932 indicates a cost allocated per a unit of time that the AV is assigned to a task. For example, large expensive AVs may cost most even sitting still than smaller cheaper AVs. The per distance unit cost field 1934 indicates a cost per unit of distance (e.g. meter or kilometers) traveled by the AV. The per distance unit cost field 1934 may be used by the disclosed embodiments to determine a cost associated with moving the AV from a first location to a second location. This may include, for example, moving the AV to a recharge location to recharge another AV, or moving a payload to its destination.

FIG. 20 is a flowchart for a process of tasking an AV based on a comparison of values of different taskings. In some aspects, one or more of the functions discussed below with respect to FIG. 20 may be performed by hardware processing circuitry. For example, instructions 1824 stored in one or more of the memories 1804 and/or 1806 may configure the processor 1802 to perform one or more of the functions discussed below. After start operation 2005, process 2000 moves to operation 2010.

In operation 2010, a first value associated with providing charge to a first AV via a second AV is determined. Determining the first value may include determining a benefit of providing the charge to the first AV, but also determining costs associated with providing the charge. In some aspects, operation 2010 may operate according to process 1400, discussed above with respect to FIG. 14 to determine value associated with providing charge to the first AV. Operation 2010 may further operate in accordance with process 1500 of FIG. 15 with respect to determining costs associated with providing charge to the first AV. As discussed above, increasing the charge of the first AV may increase an operating range of the first AV, allowing the first AV to visit additional destinations. However, recharging the AV imposes some costs both on the first AV and the second AV. Each of the first and second AVs may need to deviate from an existing route or location to meet at a recharge location. Additionally, some time is consumed while the recharge event takes place. This time will delay delivery of any payload carried or planned for carriage by the second AV. Furthermore, the second AV's charge state will be reduced from recharging of the first AV. This may prevent the second AV from performing an existing delivery plan assigned to the second AV. The delivery plan may specify the delivery of one or more payloads to one or more corresponding destinations. The reduced charge state of the second AV resulting from recharging the first AV may require the second AV to be recharged itself before it can continue delivering payloads as planned. This additional recharging may require the second AV to further deviate from its planned route. For example, the second AV may first travel to a recharge location where the first AV is recharged. The second AV may then travel to a second recharge location where it is recharged. The second AV may then continue with its original delivery plan.

Each of these effects may be assigned a cost/benefit or a weight. For example, a negative cost or weight may be allocated for every unit of distance traveled by the first AV and the second AV. A second negative cost or weight may be allocated for every unit of time for which a payload is delayed beyond a delivery deadline time. A third positive weight or benefit may be associated with delivery of each payload. A fourth negative cost may be allocated for every unit of recharge removed from an AV charging another AV.

Operation 2010 may aggregate the positive weights (benefits) and aggregate the negative weights (costs) to determine a value provided with recharging the first AV with the second AV.

In operation 2012, a second value associated with delivering a payload to a first destination via the second AV is determined. In some aspects, operation 2012 will access the payload table 1900 and/or AV cost table 1920 to determine the second value. For example, the payload table indicates a delivery benefit (e.g. via benefit or weight field 1910) associated with delivery the payload to the first destination. The AV cost table 1920 indicates a current location (e.g. 1930). Operation 2012 may determine a distance from the current location to the destination, and how long it will take for the second AV to travel to the destination. Based on the time and distance information, a cost associated with completing the delivery of the payload to the first destination may be determined (e.g., value of the asset cost per time unit field 1932*time to travel to first destination+distance to first destination*per distance unit cost (e.g. field 1934)). Operation 2012 may further consider the benefits of delivering the payload to the first destination. For example, operation 2012 may consult the payload table 1900 to determine a benefit of delivery of the first payload (e.g. via benefit or weight field 1910).

In operation 2015, the first value and second value are compared. Operation 2015 may be implemented to identify a superior cost/benefit ratio for a particular tasking of the second AV. For example, if the value of charging the first AV exceeds that of continuing with an existing tasking of the second AV, then the second AV's tasking may be changed to provide for recharging of the first AV. In some aspects, operation 2015 compares more options for recharging the first AV than those described above with respect to operations 2010 and 2012. For example, if a plurality of AV's are within an operational range of the first AV, values associated with recharging the first AV via each of the plurality of AV's may be determined. The values may then be ranked, with the highest value option being selected for implementation.

In operation 2018, the second AV is tasked based on the comparison. For example, as described above, if providing charge to the first AV represents higher value than maintaining an existing tasking of the second AV, the second AV may be re-tasked to provide charge to the first AV. Alternatively, if maintaining the existing tasking of the second AV provides higher value, the second AV may not be re-tasked in operation 2018. Instead, another (third) AV may be assigned to provide charge to the first AV. After operation 2018 completes, process 2000 moves to operation 2020.

FIG. 21 is a flowchart of a process for deviating an AV from an existing assignment to a different assignment based on a relative value of the two assignments. In some aspects, one or more of the functions discussed below with respect to FIG. 21 may be performed by hardware processing circuitry. For example, instructions 1824 stored in one or more of the memories 1804 and/or 1806 may configure the processor 1802 to perform one or more of the functions discussed below with respect to process 2100 and FIG. 21. In some embodiments, the process 2100 is performed by the mobility network server(s) 110, discussed above. In the discussion below, a device executing the process 2100 is referred to as an "executing device."

After start operation 2105, process 2100 moves to operation 2110.

In operation 2110, a first value associated with maintaining an in-progress first task of a first AV is determined. For example, as discussed above, in some aspects, the first AV may be tasked with delivering a payload to a destination. In some other situations, the first AV may be tasked with recharging a second AV. Operation 2110 determines a value associated with the current tasking. For example, if the tasking is to deliver a payload, operation 2110 may determine a remaining distance between a current location of the AV (e.g. 1930) and the destination for the payload (e.g. indicated by the destination field 1906). Operation 2110 may then determine a time required for the AV to travel to the destination. The time may be based on a speed of the AV (e.g. 1931) and the distance. Cost associated with this time may be computed based on an asset cost per time (e.g. as indicated by the asset cost per time unit field 1932). A cost associated with the distance may be computed based on a per distance cost (e.g. field 1934)*the distance. These costs associated with delivering the payload may be offset based on a value of delivering the payload (e.g. benefit or weight field 1910). The benefits minus the costs may represent the first value in some aspects of operation 2110.

In operation 2112, a second value associated with re-tasking the first AV with a second task is determined. Re-tasking the AV may include assigning the AV with a task of recharging a second AV. Regardless of the nature of the re-tasking, the re-tasking is likely to impose additional distance requirements on the AV and also delay completion of the in progress task. Costs associated with these additional distances and delays may be based, in some aspects, on the information stored in a payload table (e.g. 1900) and/or AV table (e.g. via the AV cost table 1920). Once an additional distance is determined, an additional time may also be determined. The additional time may be based on a speed of the AV (e.g. 1931) and the additional distance. Once an additional time is determined, a cost associated with the additional time may be determined based on an asset based time cost (e.g. as indicated by the asset cost per time unit field 1932). Furthermore, a determination of whether an existing payload of the AV will meet its deadline may also be determined based on the additional distance and additional time. For example, operation 2112 may determine to what extent the additional time will cause delivery of the payload to exceed its delivery deadline (e.g. as specified in delivery deadline field 1912). If the deadline is exceeded, a cost associated with the delay may be determined based on a per payload delay cost (e.g. via delay cost or weight per unit of time field 1914), which may be based on an amount the deadline is exceeded.

These costs may be at least partially offset by benefits derived from the re-tasking. For example, as explained above, recharging an AV may provide for the recharged AV to deliver additional value relative to operations without the recharging. For example, as discussed above with respect to FIG. 14, recharging of an AV may provide for the AV to reach additional destination not otherwise possible w/o a recharging. These additional destinations provide for some incremental value relative to the costs of re-tasking.

In some cases, an AV may be capable of carrying more than one payload at a time. Thus, the re-tasking in some cases may request an AV to pick-up a second payload and carry the second payload to a second destination. In these cases, the value associated with the re-tasking will include the benefits of delivering the second payload to the second destination (e.g. via benefit or weight field 1910). Costs associated with delivering the second payload may include an incremental distance necessary to move the AV from its current location (e.g. 1930) to an origin location of the second payload (e.g. 1904), travel to the second destination (e.g., indicated by destination field 1906), and then deliver the first payload to its respective destination.

Operation 2115 then compares the first value associated with completing the first task with the second value associated with re-tasking the first drone to complete the second task, while the first task is delayed. In some embodiments, if the second value is higher than the first value, the first drone is re-tasked. In other embodiments, a predefined threshold difference in value is necessary before the first drone is re-tasked. Marginal or deminimus improvements in value are not considered to be enough, in these embodiments, to disrupt existing tasking.

After process 2100 determines whether to re-task the first drone, process 2100 moves to operation 2118 which generates instructions for the first drone based on the determination. In some embodiments, the instructions take the form of a message, generated by process 2100, that indicates the instructions and any parameter values necessary for defining the instructions. For example, if the first drone is re-tasked, information defining the second task are included in the message.

After operation 2118 completes, process 2100 moves to end operation 2120.

FIG. 22 is a flowchart of a process for deviating an AV from an existing assignment to a different assignment based on a relative value of the two assignments. In some aspects, one or more of the functions discussed below with respect to FIG. 22 may be performed by hardware processing circuitry. For example, instructions 1824 stored in one or more of the memories 1804 and/or 1806 may configure the processor 1802 to perform one or more of the functions discussed with respect to FIG. 22. In some embodiments, the process 2200 is performed by the mobility network server(s) 110, discussed above. In the discussion below, a device executing the process 2200 is referred to as an "executing device."

After start operation 2205, process 2200 moves to operation 2210, where a first charge level and a first location of a first drone are determined. For example, as discussed above, in some embodiments, and AAV, GAV, or a light electric vehicle communicate over a network (e.g. network 106) with a back-end or cloud based server, such as the mobility network server(s) 110 discussed above. That communication includes, in some embodiments, the done providing its charge level and location to the mobility network server(s) 110. This information is provided periodically or otherwise repeatedly over a period of time, at least in some embodiments.

In operation 2212, a range and a second location of a second drone is determined. Thus, in some embodiments, operation 2212 includes receiving a message (e.g. via a network, such as network 106) indicating the second location. In some embodiments, operation 2212 includes receiving a message indicating a charge level of the second drone. In some embodiments, the first and second messages are the same message. In some embodiments, one of the first or second messages, or both, also indicates a type of the drone or a range of the drone. In some embodiments, a remaining range of the drone is provided in one of the messages. In other embodiments, a maximum range of the drone with a full charge state is provided in one of the messages. A device then performing operation 2212 determines a remaining range based on the charge state of the second drone and the maximum range with a full charge.

Operation 2215 determines to recharge the first done with the second drone. The determination is based on the first charge level (of the first drone), the first location (of the first done), and the second location (of the second drone). In some embodiments, operation 2215 determines a value associated with additional charge in the first drone, and a second value associated with charge in the second drone. Operation 2215 also considers a cost associated with moving the second drone to the first drone's location in order to recharge the first drone with the second drone. Thus, in a simple example, if the cost of providing the charge is less than a difference in value between charge state in the first drone versus that charge state being in the second drone, operation 2215 determines to perform the recharge of the first drone via the second drone. In some embodiments, operation 2215 considers a plurality of drones as possible sources of charge for the first drone. In these embodiments, the incremental value provided by charging the first drone via each of the plurality of drones is determined separately for each of the plurality of drones. The one drone of the plurality of drones that provides the greatest incremental value is then selected to recharge the first drone. As discussed above, each incremental value of recharging via a respective drone is based on one or more of a distance between the respective drone and the first drone, a priority of a task currently assigned to the respective drone, an amount of charge needed by the first drone, an amount of charge available from the respective drone, or other factors.

In operation 2218, a route is determined from the second location to the first location. In other words, if the second drone is going to recharge the first drone, in some embodiments, a route from where the second drone is located to the first position is needed. In some embodiments, the route is determined based on recharging locations available to the second drone along the route. Thus, in some embodiments, in order to recharge the first drone, a higher value is associated with a first recharge plan, where the second drone adds additional charge before recharging the first drone. Thus, in some embodiments, if an intermediate recharge event is desired before recharging the first drone, operation 2218 determines a first route from the second location to a recharge location, and a second route from the recharge location to the first location. Otherwise, if no intermediate recharge event is needed, then operation 2218 determines a route directly from the second location to the first location.

In operation 2220, the determined route and the first location is provided or transmitted to the second drone. For example, in some embodiments, a network message is generated and sent by the executing device to the second drone. The network message indicates a command instructing the second drone to travel alone the route specified in the network message and to recharge the first drone at the first location. In some embodiments, the network message instead indicates that the second drone should first recharge itself at an intermediate recharge location, and provides the recharge location and a route to the recharge location to the second drone. In some embodiments, the network message also provides instructions for the second drone after the recharge is complete, such as traveling along a second route from the recharge location to the first location. After operation 2220 completes, process 2200 moves to end operation 2222.

FIG. 23 is a flowchart of a process for deviating an AV from an existing assignment to a different assignment based on a relative value of the two assignments. In some aspects, one or more of the functions discussed below with respect to FIG. 23 may be performed by hardware processing circuitry. For example, instructions 1824 stored in one or more of the memories 1804 and/or 1806 may configure the processor 1802 to perform one or more of the functions discussed with respect to FIG. 23. In some embodiments, the process 2300 discussed below with respect to FIG. 23 is performed by the mobility network server(s) 110, discussed above. In the discussion below with respect to FIG. 23, a device performing the process 2300 is referred to, in some instances, as an "executing device."

After start operation 2305, process 2300 moves to operation 2310, where a first priority of a task that is "in progress" with a first drone is determined. The task is "in progress" in that the first drone has begun a process that works toward completing the task, but has not yet completed the task. Thus, for example, if the task is to deliver a payload to a particular destination, the first drone could be recharging itself to begin movement to pick-up the payload, traveling to pick-up the payload, in the process of loading the payload, traveling toward the destination with the payload or engaged in other activities that further the task. The priority determination of the (first) task relates, in various embodiments, to a priority of a payload associated with the first task, and/or another task dependent on the first task. The first task priority is used, in at least some embodiments, in determining if the first priority is sufficient to maintain an assignment of the first drone to the first task, or if the first task should be deferred in favor of assigning the first drone to a second, higher priority task, as discussed further below.

In some embodiments, operation 2310 receives information from the first drone to determine the priority of the first task. For example, in some embodiments, the executing device receives charge state information from the first drone, indicating a percentage of battery charge and/or a remaining range of the first drone. In some embodiments, the priority of the first task is based on whether the first drone has enough range and/or charge remaining to complete the first task without a recharge. Some embodiments reduce a tasks priority based on a number of recharge events required to complete the task.

Additional information is received from the first drone, in some embodiments, indicating the first drone's location. Thus, for example, the priority of the first task is in some cases based on a percentage of the first task that has already been completed. Thus, if the first drone has traveled, for example, 90% of the distance required to complete the first task, the first priority of the first task is higher than it would be if the first drone had just begun traveling (e.g. less than 10% of the distance completed, for example).

Operation 2312 determines a second priority associated with a second task. Similar to the first priority of the first task, the second priority associated with the second task relates to one or more of a priority of a payload associated with the second task and/or an additional task dependent on completion of the second task. In various embodiments, one or more of the considerations discussed above with respect to the first priority and the first task are also considerations with respect to the second priority and second task. In some embodiments, the priority of the second payload is a priority relative to other payloads for pick-up by the first drone. In some embodiments, a priority of the second payload relates to a waiting time of the payload. For example, some embodiments escalate a priority of a payload over time until the payload is assigned for delivery to a drone.

Operation 2315 determines to defer the first task and assign the second task to the first drone. The determination is based, at least in some embodiments, on a relation between the first priority and the second priority. In some embodiments, operation 2315 also considers a cost of deferring the first task and switching the first drone from the first task to the second task. For example, a route associated with performing the second task deviates from a second route associated with performing the first task in some manner. This deviation requires, in some circumstances, the first drone to travel some distance just to transition from performing the first task to performing the second task. This distance has a first cost associated with it, both in terms of time required to travel the distance and also charge that is consumed during the travel. Thus, the deferral determination of operation 2315 considers this first cost, in at least some embodiments. Additionally, when the second task is completed, an additional cost is associated with returning the first drone to performing the first task. For example, a completion location of the second task is some distance from a deferral location of the first task. A second cost is associated with traveling from the completion location to the deferral location. This second cost is also considered, in some embodiments, when determining whether to defer the first task and assign the second task to the first drone.

An additional cost associated with deferring the first task is a cost associated with a time delay of completion of the first task. Thus, some embodiments of operation 2315 determine an amount of time delay expected for the first task if the first task is delayed such that the first drone can accomplish the second task. This time delay is used, in some embodiments, to associate a priority with respect to the second task. Thus, in some embodiments, a tasks priority is context dependent, in that it is determined based on factors beyond the task itself.

In some embodiments, an additional cost associated with deferring the first task in favor of the second task is any recharging of the first drone that is necessary for the first drone to complete the second task. Thus, this additional recharging cost, if it exists, is considered in a determination of whether to defer the first task and assign the first drone to the second task. As discussed above, in some embodiments, decisions associated with managing a charge state of a drone consider, for example, a value associated with the drone without a recharge and a second value associated with a recharge. These values are also adjusted based on a cost of acquiring the recharge, which can include not only the cost of the charge itself, but travel costs associated with traveling to a recharge station, time associated with recharging, and/or other costs. Thus, if the second task relates to recharging a second drone located at the second position, operation 2315 considers an existing charge state of the second drone, and determines, in some embodiments, a value provided by changing the charge state of the second drone from the existing charge state to a second, higher charge state.

In some embodiments, method 2300 considers whether the first drone needs to offload any payload begin beginning the second task. For example, in some embodiments, the first drone can complete the second task while maintaining a payload associated with the first task. For example, in some embodiments, the second task does not include a payload (e.g. a task to recharge another AV). In some embodiments, the first drone is able to carry multiple payloads, and can carry a first payload associated with the first task and a second payload associated with the second task, and thus, no unloading of the first payload is required. In some embodiments, there is no payload associated with the first task, and thus deferring the first task does not require any consideration of payload handling relating to the deferral.

In some embodiments, a plurality of possible other tasks are considered when determining whether to defer the first task. Thus, deferring the first task and assigning the first task to the second task competes with deferring the first task in favor of one or more other task (e.g. included in the plurality of possible other tasks).

In some embodiments, the second task is to obtain imagery of a vehicle. For example, as discussed above, some embodiments use one or more AAVs to monitor a staging location of light electric vehicles, such as scooters, bikes, or motorcycles or a right of way that is potentially impacted by these light electric vehicles. Thus, some embodiments determine a distance between the first location and a position an AAV needs to be in to properly image the staging area. Additional considerations when determining a priority of this example second task include an elapsed time since the staging area was last imaged. For example, some municipalities enforce regulations that require electric vehicle operators to ensure their light electric vehicles are not blocking rights of way, such as sidewalks, parking lots, or roads. Thus, as an amount of time since a previous imaging of these rights of way or staging areas increases, the higher the probability that a light electric vehicle has been positioned by a customer so as to violate the regulations. Thus, in this example embodiment, the second priority is based on an elapsed time since a previous imaging of the right of way or staging area.

In some embodiments, operation 2318 determines whether to defer the first task based on a waiting time of the second task. Thus, similar to some operating system dispatchers, a task's priority is elevated, in some embodiments, as it continues to wait for resources. This can avoid starving a task that might otherwise not be high enough priority to complete, given, for example, one or more positions of autonomous vehicles/drones, a location of a payload associated with the task (e.g. remote, not particular near commonly traveled drone routes, etc).

In some embodiments, an orientation alert is received from the first drone. Whether to defer the first task is then based on the orientation alert. For example, if the first drone is not oriented such that it is mobile (e.g. the vehicle has turned upside down or on its side), the first vehicle is not assigned to the second task, since it is not able to complete any tasks until its orientation is corrected.

In operation 2318, an instruction is provided to the first drone. The instructions are based on determinations made in operation 2315 discussed above. For example, some embodiments of operation 2318 generate a message indicating instructions to the first drone. The message indicates one or more of a destination location for the first drone, task description for the first drone, deferral instructions regarding the first task, or other parameters necessary to cause the first drone to perform actions consistent with the determination(s) of operation 2315. After operation 2318 completes, process 2300 moves to end operation 2323.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

Example 1 is a method performed by hardware processing circuitry, comprising: performing a priority determination to determine a first priority of maintaining an in progress first task of a first drone; performing a further priority determination to determine a second priority associated with assigning a second task to the first drone; performing a deferral determination to defer the in-progress first task of the first drone and assign the second task to the first drone based on the first and second priorities; and instructing the first drone according to the deferral determination.

In Example 2, the subject matter of Example 1 optionally includes wherein determining the second priority comprises determining a delay in completion of the first task as a result of deferring the first task, wherein the determining of the second priority is based on the delay.

In Example 3, the subject matter of any one or more of Examples 1-2 optionally include wherein determining the second priority comprises determining a range of the first drone, and determining a plurality of payloads available for pick-up within the range, wherein the second priority is based on the plurality of payloads.

In Example 4, the subject matter of any one or more of Examples 1-3 optionally include determining a state of charge of the first drone, determining whether assigning the second task to the first drone will include recharging of the first drone based on the state of charge, wherein the second priority is based on the determination of whether re-tasking includes recharging.

In Example 5, the subject matter of any one or more of Examples 1-4 optionally include wherein the second task is obtaining imagery of a vehicle, and wherein the second priority is based on a distance between a location of the first drone and the vehicle.

In Example 6, the subject matter of Example 5 optionally includes determining an elapsed time the vehicle has been at a stable position, wherein the second priority is based on the elapsed time.

In Example 7, the subject matter of any one or more of Examples 1-6 optionally include wherein the second task is recharging a second drone, and the method further comprises determining a charge status of the second drone, wherein the second priority is further based on the charge status.

In Example 8, the subject matter of Example 7 optionally includes determining a payload the second drone, wherein the second priority is further based on the payload.

In Example 9, the subject matter of Example 8 optionally includes determining a distance between the first drone and the second drone, wherein the second priority is further based on the distance.

In Example 10, the subject matter of Example 9 optionally includes determining a recharge location for the second drone, and determining a second distance between the recharge location and a destination associated with the first task, wherein the second priority is further based on the second distance.

Example 11 is a system, comprising: hardware processing circuitry; one or more memories storing instructions that when executed configure the hardware processing circuity to perform operations comprising: performing a priority determination to determine a first priority of maintaining an in progress first task of a first drone; performing a further priority determination to determine a second priority associated with assigning a second task to the first drone; performing a deferral determination to defer the in-progress first task of the first drone and assign the second task to the first drone based on the first and second priorities; and instructing the first drone according to the deferral determination.

In Example 12, the subject matter of Example 11 optionally includes wherein determining the second priority comprises determining a delay in completion of the first task as a result of deferring the first task, wherein the determining of the second priority is based on the delay.

In Example 13, the subject matter of any one or more of Examples 11-12 optionally include wherein determining the second priority comprises determining a range of the first drone, and determining a plurality of payloads available for pick-up within the range, wherein the second priority is based on the plurality of payloads.

In Example 14, the subject matter of any one or more of Examples 11-13 optionally include the operations further comprising, determining a state of charge of the first drone, determining whether assigning the second task to the first drone will include recharging of the first drone based on the state of charge, wherein the second priority is based on the determination of whether re-tasking includes recharging.

In Example 15, the subject matter of any one or more of Examples 11-14 optionally include wherein the second task is obtaining imagery of a vehicle, and wherein the second priority is based on a distance between a location of the first drone and the vehicle.

In Example 16, the subject matter of Example 15 optionally includes the operations further comprising determining an elapsed time the vehicle has been at a stable position, wherein the second priority is based on the elapsed time.

In Example 17, the subject matter of any one or more of Examples 11-16 optionally include wherein the second task is recharging a second drone, and the operations further comprises determining a charge status of the second drone, wherein the second priority is further based on the charge status.

In Example 18, the subject matter of Example 17 optionally includes determining a current payload of the second drone; determining a distance between the first drone and the second drone, wherein the second priority is further based on the payload and the distance.

In Example 19, the subject matter of Example 18 optionally includes the operations further comprising determining a recharge location for the second drone, and determining a second distance between the recharge location and a destination associated with the first task, wherein the second priority is further based on the second distance.

Example 20 is a non-transitory computer readable storage medium comprising instructions that when executed configure hardware processing circuitry to perform operations comprising: performing a priority determination to determine a first priority of maintaining an in progress first task of a first drone; performing a further priority determination to determine a second priority associated with assigning a second task to the first drone; performing a deferral determination to defer the in-progress first task of the first drone and assign the second task to the first drone based on the first and second priorities; and instructing the first drone according to the deferral determination.

The invention claimed is:

1. A method performed by hardware processing circuitry, comprising:
   performing a priority determination to determine a first priority of maintaining an in progress first task of a first drone;
   performing a further priority determination to determine a second priority associated with assigning a second task to the first drone, wherein determining the second priority comprises determining a delay in completion of the first task as a result of deferring the first task, wherein the determining of the second priority is based on the delay;
   performing a deferral determination to defer the in progress first task of the first drone and assign the second task to the first drone based on the first and second priorities; and
   instructing the first drone according to the deferral determination.

2. The method of claim 1, wherein determining the second priority comprises determining a range of the first drone, and determining a plurality of payloads available for pick-up within the range, wherein the second priority is based on the plurality of payloads.

3. The method of claim 1, further comprising, determining a state of charge of the first drone, determining whether assigning the second task to the first drone will include recharging of the first drone based on the state of charge, wherein the second priority is based on the determination of whether re-tasking includes recharging.

4. The method of claim 1, wherein the second task is obtaining imagery of a vehicle, and wherein the second priority is based on a distance between a location of the first drone and the vehicle.

5. The method of claim 4, further comprising determining an elapsed time the vehicle has been at a stable position, wherein the second priority is based on the elapsed time.

6. The method of claim 1, wherein the second task is recharging a second drone, and the method further comprises determining a charge status of the second drone, wherein the second priority is further based on the charge status.

7. The method of claim 6, further comprising determining a payload the second drone, wherein the second priority is further based on the payload.

8. The method of claim 7, further comprising determining a distance between the first drone and the second drone, wherein the second priority is further based on the distance.

9. The method of claim 8, further comprising determining a recharge location for the second drone, and determining a second distance between the recharge location and a destination associated with the first task, wherein the second priority is further based on the second distance.

10. A system, comprising:
    hardware processing circuitry;
    one or more memories storing instructions that when executed configure the hardware processing circuitry to perform operations comprising:
    performing a priority determination to determine a first priority of maintaining an in progress first task of a first drone;
    performing a further priority determination to determine a second priority associated with assigning a second task to the first drone, wherein determining the second priority comprises determining a delay in completion of the first task as a result of deferring the first task, wherein the determining of the second priority is based on the delay;
    performing a deferral determination to defer the in progress first task of the first drone and assign the second task to the first drone based on the first and second priorities; and
    instructing the first drone according to the deferral determination.

11. The system of claim 10, wherein determining the second priority comprises determining a range of the first drone, and determining a plurality of payloads available for pick-up within the range, wherein the second priority is based on the plurality of payloads.

12. The system of claim 10, the operations further comprising, determining a state of charge of the first drone, determining whether assigning the second task to the first drone will include recharging of the first drone based on the state of charge, wherein the second priority is based on the determination of whether re-tasking includes recharging.

13. The system of claim 10, wherein the second task is obtaining imagery of a vehicle, and wherein the second priority is based on a distance between a location of the first drone and the vehicle.

14. The system of claim 13, the operations further comprising determining an elapsed time the vehicle has been at a stable position, wherein the second priority is based on the elapsed time.

15. The system of claim 10, wherein the second task is recharging a second drone, and the operations further comprises determining a charge status of the second drone, wherein the second priority is further based on the charge status.

16. The system of claim 15, further comprising:
determining a current payload of the second drone;
determining a distance between the first drone and the second drone, wherein the second priority is further based on the payload and the distance.

17. The system of claim 16, the operations further comprising determining a recharge location for the second drone, and determining a second distance between the recharge location and a destination associated with the first task, wherein the second priority is further based on the second distance.

18. A non-transitory computer readable storage medium comprising instructions that when executed configure hardware processing circuitry to perform operations comprising:
performing a priority determination to determine a first priority of maintaining an in progress first task of a first drone;
performing a further priority determination to determine a second priority associated with assigning a second task to the first drone, wherein determining the second priority comprises determining a delay in completion of the first task as a result of deferring the first task, wherein the determining of the second priority is based on the delay;
performing a deferral determination to defer the in progress first task of the first drone and assign the second task to the first drone based on the first and second priorities; and
instructing the first drone according to the deferral determination.

19. A method performed by hardware processing circuitry, comprising:
performing a priority determination to determine a first priority of maintaining an in progress first task of a first drone;
performing a further priority determination to determine a second priority associated with assigning a second task to the first drone, wherein determining the second priority comprises determining a range of the first drone, and determining a plurality of payloads available for pick-up within the range, wherein the second priority is based on the plurality of payloads;
performing a deferral determination to defer the in progress first task of the first drone and assign the second task to the first drone based on the first and second priorities; and
instructing the first drone according to the deferral determination.

20. A method performed by hardware processing circuitry, comprising:
performing a priority determination to determine a first priority of maintaining an in progress first task of a first drone;
performing a further priority determination to determine a second priority associated with assigning a second task to the first drone;
determining a state of charge of the first drone, determining whether assigning the second task to the first drone will include recharging of the first drone based on the state of charge, wherein the second priority is based on the determination of whether re-tasking includes recharging;
performing a deferral determination to defer the in progress first task of the first drone and assign the second task to the first drone based on the first and second priorities; and
instructing the first drone according to the deferral determination.

* * * * *